United States Patent
Sakaguchi et al.

(10) Patent No.: US 7,754,844 B2
(45) Date of Patent: Jul. 13, 2010

(54) POLYARYLENE ETHER COMPOUND CONTAINING SULFONIC ACID GROUP, COMPOSITION CONTAINING SAME, AND METHOD FOR MANUFACTURING THOSE

(75) Inventors: Yoshimitsu Sakaguchi, Otsu (JP); Kota Kitamura, Otsu (JP); Shigenori Nagahara, Otsu (JP); Masahiro Yamashita, Otsu (JP); Junko Nakao, Wakayama (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 1320 days.

(21) Appl. No.: 10/530,199
(22) PCT Filed: Oct. 7, 2003
(86) PCT No.: PCT/JP03/12850
§ 371 (c)(1), (2), (4) Date: Apr. 4, 2005
(87) PCT Pub. No.: WO2004/033534
PCT Pub. Date: Apr. 22, 2004

(65) Prior Publication Data
US 2006/0166048 A1 Jul. 27, 2006

(30) Foreign Application Priority Data
Oct. 8, 2002 (JP) .................. 2002-295284
Feb. 10, 2003 (JP) .................. 2003-032621
Feb. 10, 2003 (JP) .................. 2003-032622

(51) Int. Cl.
C08G 75/23 (2006.01)
C08G 75/20 (2006.01)
H01M 8/02 (2006.01)
B01D 71/52 (2006.01)
B01D 71/62 (2006.01)
C08L 79/04 (2006.01)
C08L 79/08 (2006.01)

(52) U.S. Cl. .............. 528/171; 528/391; 528/211; 525/328.5; 525/329.1; 525/535; 521/27; 429/12

(58) Field of Classification Search ............... 528/171, 528/391, 211; 525/125, 328.5, 329.1, 535; 429/12; 521/27
See application file for complete search history.

(56) References Cited

U.S. PATENT DOCUMENTS
5,438,082 A 8/1995 Helmer-Metzmann et al.
(Continued)

FOREIGN PATENT DOCUMENTS
JP 63-291920 11/1988
(Continued)

OTHER PUBLICATIONS
R. Nolte et al.: "Partially sulfonated poly(arylene ether sulfone)—A versatile proton conducting membrane material for modern energy conversion technologies", Journal of Membrane Science Elsevier Science Publishers B.V., vol. 83 1993 pp. 211-220.
(Continued)

*Primary Examiner*—Duc Truong
(74) *Attorney, Agent, or Firm*—Kenyon & Kenyon LLP

(57) ABSTRACT

A polyarylene ether-based compound according to the present invention includes polymer components represented in general formula (1) and general formula (2):

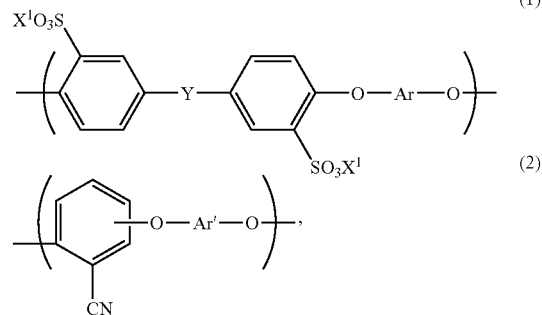

wherein Ar indicates a divalent aromatic group, Y indicates a sulfone group or a ketone group, X indicates H or a monovalent cation species, and Ar' indicates a divalent aromatic group.

39 Claims, 5 Drawing Sheets

U.S. PATENT DOCUMENTS

| | | | |
|---|---|---|---|
| 5,561,202 | A | 10/1996 | Helmer-Metzmann et al. |
| 5,596,128 | A | 1/1997 | Ogata et al. |
| 5,741,408 | A | 4/1998 | Helmer-Metzmann et al. |
| 6,214,488 | B1 | 4/2001 | Helmer-Metzmann et al. |
| 2002/0091225 | A1 | 7/2002 | McGrath et al. |

FOREIGN PATENT DOCUMENTS

| | | |
|---|---|---|
| JP | 06-093114 | 4/1994 |
| JP | 6-279582 | 10/1994 |
| JP | 9-245818 | 9/1997 |
| JP | 2-884189 B | 2/1999 |
| JP | 2002-220530 | 8/2002 |
| JP | 2002-367629 | 12/2002 |
| JP | 2002-543224 | 12/2002 |
| JP | 2003-12793 | 1/2003 |
| JP | 2003-012795 | 1/2003 |
| JP | 2003-147075 | 5/2003 |
| JP | 2003-217342 | 7/2003 |
| JP | 2004-509224 | 3/2004 |
| WO | WO 99/010165 | 3/1999 |
| WO | WO 00/24796 | 5/2000 |
| WO | WO 00/64951 | 11/2000 |

OTHER PUBLICATIONS

J. Mecham et al., "Synthesis and Characterization of Controlled Molecular Weight Sulfonated Aminofunctional Poly(arylene Ether Sulfone)s Prepared by Direct Polymerization" American Chemical society, Polymer Preprints The Division of Polymer Chemistry, Inc., vol. 41, No. 2 2000 pp. 1388-1389.

Takeshi Kobayashi et al., "Proton-conducing polymers derived from poly(ether-etherketone) and poly(4-phenoxybenzoy1-1,4-phenylene)" Solid State Ionics Elsevier Science Publishers B.V., vol. 106, Nos. 3 and 4 1998 pp. 219-225.

Jasun Lee et al.: "Polyaromatic Ether-Ketone Sulfonamides Prepared from Polydiphenyl Ether-ketones by Chlorosulfonation and Treatment with Secondary Amines" Journal of Polymer Science; Polymer Chemistry Edition John Wiley & Sons, Inc., vol. 22, No. 2 1984 pp. 295-301.

B.C. Johnson et al.: "Synthesis and Chracterization of Sulfonated Poly(arylene Ether Sulfones)" Journal of Polymer Science: Polymer chemistry Edition John Wiley & Sons, Inc., vol. 22, No. 3 1984 pp. 721-737.

Takeshi Ogawa et al.: "Polyaromatic Ether-Ketones and Ether-Keto-Sulfones Having Various Hydrophilic Groups" Journal of Polymer Science: Polymer Chemistry Edition, John Wiley & Sons, Inc., vol. 23, No. 4 1985 pp. 1231-1241.

James F. Wolfe, "Polybenzothiazoles and Polybenzoxazoles" Encyclopedia of Polymer Science and Engineering John Wiley & Sons, Inc., vol. 11 1988 pp. 601-635.

POLYARYLENE ETHER COMPOUND CONTAINING SULFONIC ACID GROUP, COMPOSITION CONTAINING SAME, AND METHOD FOR MANUFACTURING THOSE

This is a 371 national phase application of PCT/JP2003/012850 filled 07 Oct. 2003, claiming priority to Japanese Application No. 2002-295284 filed 08 Oct. 2002, No. 2003-032621 filed 10 Feb. 2003, and No. 2003-032622 filed 10 Feb. 2003, the contents of which are incorporated herein by reference.

TECHNICAL FIELD

The present invention relates to a polyarylene ether-based compound that contains a sulfonic group which is useful as a polymer electrolyte membrane.

BACKGROUND ART

An electrolyzer and a fuel cell can be cited as examples of an electrochemical device where a polymer solid electrolyte is used as an ion conductor in place of a liquid electrolyte. Polymer membranes used for these must be sufficiently stable chemically, thermally, electrochemically and mechanically and must have a high proton conductivity as a cation exchange membrane. Therefore, a perfluorocarbon sulfonic acid membrane, of which a typical example is "Nafion (registered trade mark) made by DuPont Inc., USA" has been utilized as a polymer membrane which can be utilized for a long period of time. In the case where a Nafion membrane is operated under the condition where the temperature exceeds 100° C., however, the water content of the membrane dramatically decreases and the membrane is significantly softened. Therefore, in a promising fuel cell where methanol is used as the fuel reduction of performance occurs due to the crossover of methanol through the membrane and the fuel cell cannot exercise a sufficient performance. In addition, also concerning a fuel cell that is operated at a temperature close to 80° C. using hydrogen as the fuel which is presently examined as a mainstream technology, an excessively high cost of the membrane is pointed out as an obstacle impeding the establishment of a fuel cell technology.

In order to overcome such defects, a variety of polymer electrolyte membranes where a sulfonic group has been introduced into a polymer that contains non-fluorine-based aromatic ring have been examined. A polymer skeleton of aromatic polyether-based compounds, such as polyarylene ether ketones, polyarylene ether sulfones is considered to be a promising structure, taking heat resistance and chemical stability into consideration and sulfonated polyarylene ether sulfones (see, for example, Journal of Membrane Science (Netherlands) 1993, vol. 83, pp. 211-220), sulfonated polyether ether ketones (see, for example, Japanese Laid-Open Patent Publication No. 6-93114 (pp. 15-17)), sulfonated polystyrenes and the like have been reported.

From among these, a sulfonated polyarylene ether that includes 4,4'-biphenol as a monomer is also reported (see, for example, WO 00/24796) which has a problem where the polymer swells under high temperature and high humidity and, in particular, this tendency becomes significant in compositions where the ratio of sulfonation becomes high. In addition, sulfonic groups that have been introduced to an aromatic ring as a result of a sulfonation reaction of these polymers in general tend to be eliminated due to heat and according to a method for obtaining a compound that has been improved in this issue, a monomer where a sulfonic group has been introduced to an electron withdrawing aromatic ring is polymerized and, thus, a sulfonated polyaryl ether sulfone-based compound of which the thermal stability is high has been reported (see, for example, US Patent No. 2002/0091225 (pp. 1-2)). In this case, a problem arises where polymerization for a long period of time is required in order to obtain a polymer due to a low reactivity of the monomer (see, for example, ACS Polymer Preprints (USA) 2000, vol. 41(2), pp. 1388-1389). This reference describes usage of 4,4'-biphenol as another monomer for copolymerization, wherein a problem also arises where the polymer swells under high temperature and high humidity and, in particular, this tendency becomes significant in compositions where the ratio of sulfonation becomes high.

DISCLOSURE OF THE INVENTION

An object of the present invention is to provide a polyarylene ether-based compound to which a sulfonic group is introduced which is excellent in polymerization and which is useful as a polymer electrolyte membrane so as to obtain a polymer material which is excellent in heat resistance, dimensional stability at a high temperature, processability and ion conductivity and which is particularly useful as an ion conducting membrane.

The present invention provides a polyarylene ether-based compound including polymer components represented in general formula (1) and general formula (2).

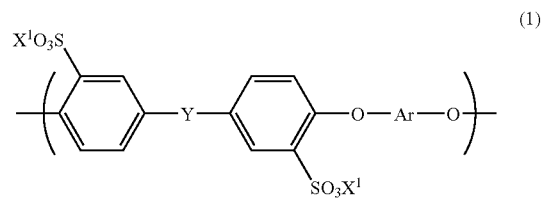

(1)

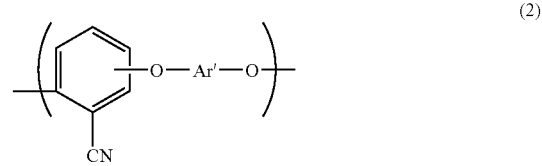

(2)

Here, Ar indicates a divalent aromatic group, Y indicates a sulfone group or a ketone group, X indicates H or a monovalent cation species and Ar' indicates a divalent aromatic group.

Preferably, at least one of the above-described Ar and Ar' includes a -Ph-Ph-group, and the —O—Ar—O— unit, the —O—Ar'—O— unit or the sum of these units shares 52 wt % or higher in the polymer structure which is a skeleton structure from which the bonded sulfonic group has been removed.

Preferably, the polyarylene ether compound of the present invention includes polymer components represented in general formula (3) and general formula (4).

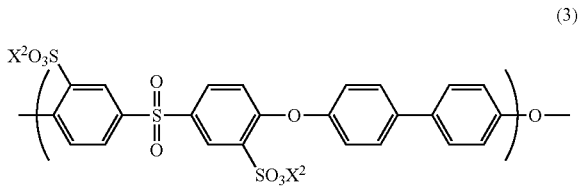

(3)

(4)

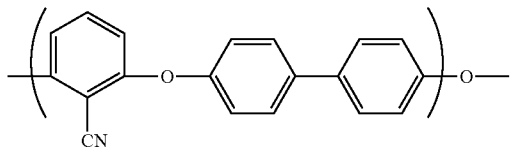

Here, $X^2$ indicates H or a monovalent cation species.

Preferably, the polyarylene ether compound of the present invention further includes polymer components represented in general formula (5) and general formula (6).

(5)

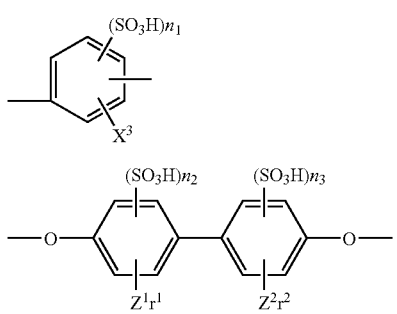

(6)

Here, in formulas (5) and (6), $n_1$, $n_2$ and $n_3$ indicate the numbers of bonds of the sulfonic group per an aromatic ring and $n_1$, $n_2$ and $n_3$ are, respectively, integers from 0 to 2 where $n_2+n_3$ is an integer from 1 to 4. $X^3$ is one or more types of functional groups which are selected from the group consisting of —CN, —COOY and —CONR$_2$, where Y indicates hydrogen, a metal atom or a variety of ammonium and R indicates one or two types of groups selected from the group consisting of hydrogen and alkyl groups. $Z^1$ and $Z^2$ are one or more types of functional groups selected from the group consisting of lower alkyl groups having 1 to 6 carbon atoms, lower alkoxyl groups having 1 to 6 carbon atoms, lower carboxyl groups having 1 to 6 carbon atoms, lower carbonyl groups having 1 to 6 carbon atoms, nitro groups, amino groups, hydroxyl groups and halogen atoms, $r^1$ and $r^2$ indicate the respective numbers of bonds of $Z^1$ and $Z^2$ per an aromatic ring where $r^1$ and $r^2$ are, respectively, integers from 0 to 4 and $n_2+r^1 \leq 4$ and $n_3+r^2 \leq 4$.

Preferably, the polyarylene ether compound of the present invention further includes a polymer component represented in general formula (7).

(7)

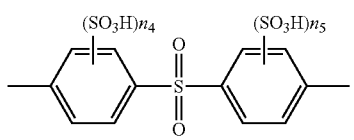

Here, in formula (7), $n_4$ and $n_5$ indicate the numbers of bonds of the sulfonic group per an aromatic ring where $n_4$ and $n_5$ are, respectively, integers from 0 to 2 and $n_4+n_5$ is an integer from 1 to 4.

Preferably, in the polyarylene ether compound of the present invention, the sulfonic group content is within a range from 0.3 meq/g to 3.5 meq/g and preferably, the sulfonic group content is within a range from 0.2 meq/g to 6.0 meq/g.

The present invention also provides a polyarylene ether-based compound which has a structure in that a sulfonic group is introduced to a polyarylene ether-based polymer that includes 52 wt % or higher of a dioxybiphenylene unit (—O-Ph-Ph-O—) in the polymer structure.

Preferably, the polyarylene ether compound of the present invention includes polymer components represented in general formula (3) and general formula (4).

(3)

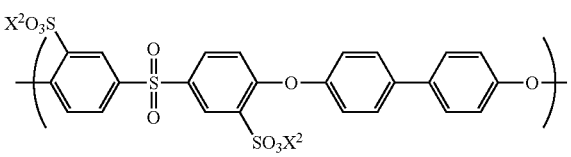

(4)

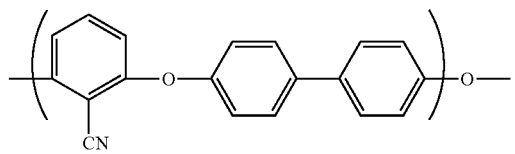

Here, $X^2$ indicates H or a monovalent cation species.

Preferably, the polyarylene ether compound of the present invention further includes polymer components represented in general formula (5) and general formula (6).

(5)

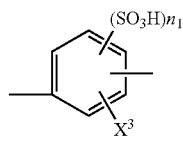

(6)

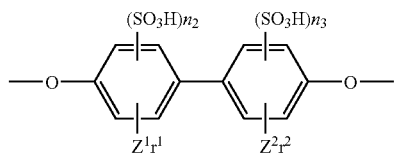

Here, in formulas (5) and (6), $n_1$, $n_2$ and $n_3$ indicate the numbers of bonds of a sulfonic group per an aromatic ring where $n_1$, $n_2$ and $n_3$ are, respectively, integers from 0 to 2 and $n_2+n_3$ is an integer from 1 to 4. $X^3$ is one or more types of functional groups selected from the group consisting of —CN, —COOY and —CONR2, where Y indicates hydrogen, a metal atom or a variety of ammonium and R indicates one or two types of groups selected from the group consisting of hydrogen and alkyl groups. $Z^1$ and $Z^2$ are one or more types of functional groups selected from the group consisting of lower alkyl groups having 1 to 6 carbon atoms, lower alkoxyl groups having 1 to 6 carbon atoms, lower carboxyl groups having 1 to 6 carbon atoms, lower carbonyl groups having 1 to 6 carbon atoms, nitro groups, amino groups, hydroxyl groups and halogen atoms, $r^1$ and $r^2$ indicate the respective numbers of bonds of $Z^1$ and $Z^2$ per an aromatic ring where $r^1$ and $r^2$ are, respectively, integers from 0 to 4 and $n_2+r^1 \leq 4$ and $n_3+r^2 23$ 4.

Preferably, the polyarylene ether compound of the present invention further includes a polymer component represented in general formula (7).

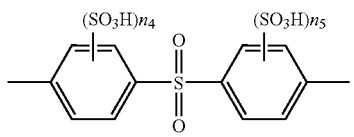

(7)

Here, in formula (7), $n_4$ and $n_5$ indicate the numbers of bonds of the sulfonic group per an aromatic ring where $n_4$ and $n_5$ are, respectively, integers from 0 to 2 and $n_4+n_5$ is an integer from 1 to 4.

Preferably, the sulfonic group content is within a range from 0.2 meq/g to 6.0 meq/g.

Preferably, in a manufacturing method of a polyarylene ether compound of the present invention, compounds represented in general formulas (13) and (14) and a bisphenol-based compound are included in an aromatic nucleophilic substitution reaction as monomers and thus are polymerized.

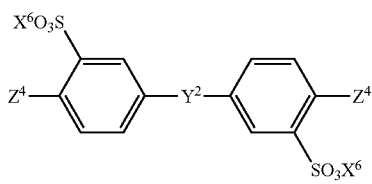

(13)

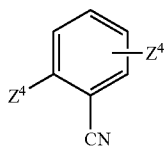

(14)

Here, $Y^2$ indicates a sulfone group or a ketone group, $X^6$ indicates a monovalent cation species and $Z^4$ indicates chlorine or fluorine.

Preferably, in a manufacturing method of a polyarylene ether compound of the present invention, compounds represented in general formulas (13) and (14) and a bisphenol-based compound are included in an aromatic nucleophilic substitution reaction as monomers and thus are polymerized.

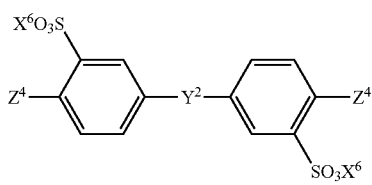

(13)

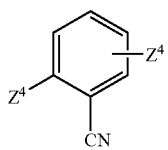

(14)

Here, $Y^2$ indicates a sulfone group or a ketone group, $X^6$ indicates a monovalent cation species and $Z^4$ indicates chlorine or fluorine.

The present invention also provides a composition including 50 wt % to 100 wt % of the above-described polyarylene ether compound.

The present invention also provides a composition including a polybenzimidazole-based compound that includes a polymer component represented in general formula (8), and the above-described polyarylene ether-based compound.

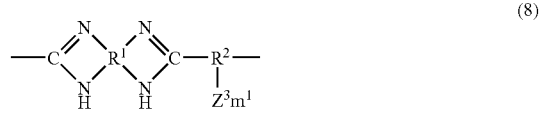

(8)

Here, in the formula, $m^1$ indicates an integer of 1 to 4, $R^1$ indicates a tetravalent aromatic bond unit that can form an imidazole ring, $R^2$ indicates a divalent aromatic bond unit where both $R^1$ and $R^2$ may be single aromatic rings, or combinations or condensed rings of a number of aromatic rings, and may have a stable substitution group, and $Z^3$ indicates a sulfonic group and/or a phosphonic group, a portion of which may have a salt structure.

Preferably, in the composition of the present invention, the polybenzimidazole-based compound contains polymer components represented in general formulas (9) and (10) in a mole ratio of (9): (10)=$n^6$:(1−$n^6$).

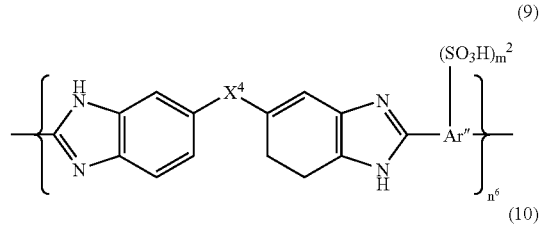

(9)

(10)

Here, in the formula, $m^2$ indicates an integer of 1 to 4, Ar″ indicates a divalent aromatic bond unit, $X^4$ indicates one or more types selected from the group consisting of —O—, —SO$_2$—, —C(CH$_3$)$_2$—, —C(CF$_3$)$_2$— and —OPhO—, and Ph indicates a divalent aromatic bond unit where $0.2 \leq n_6 \leq 1.0$.

Preferably, in the composition of the present invention, the polybenzimidazole-based compound contains polymer components represented in general formulas (11) and (12) in a mole ratio of (11):(12)=$n^7$:(1−$n^7$).

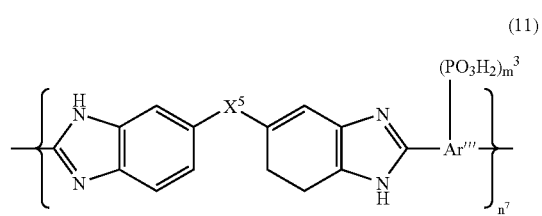

(11)

-continued (12)

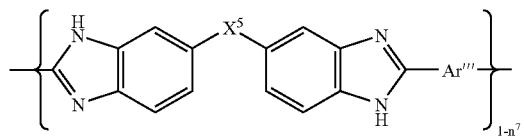

Here, in the formula, $m^3$ indicates an integer of 1 to 4, $Ar'''$ indicates an aromatic bond unit, $X^5$ indicates one or more types selected from the group consisting of —O—, —SO$_2$—, —S—, —CH$_2$— and —OPhO—, Ph indicates a divalent aromatic bond unit and $n^7$ is within a range from 0.2 to 1.0.

Preferably, in the composition of the present invention, the amount of sulfonic acid and/or phosphonic acid that is included in the above-described polyarylene ether-based compound and/or polybenzimidazole-based compound is 0.5 to 4.0 equivalent/kg.

The present invention also provides an ion conducting membrane containing the above-described compound.

Preferably, the ion conducting membrane of the present invention has a property where the methanol permeation rate through the membrane having an average thickness of 50 μm in a 5M methanol aqueous solution is 7 mmol/m$^2$·sec or less at 25° C.

Preferably, a manufacturing method of an ion conductor of the present invention includes the step of casting a solution that contains a polyarylene ether compound and a solvent in a manner where the cast thickness becomes in a range from 10 μm to 1000 μm and the step of drying the cast solution.

The present invention also provides an assembly including the above-described ion conducting membrane and electrodes.

The present invention also provides a fuel cell including the above-described assembly.

Preferably, a fuel cell of the present invention uses methanol as the fuel.

The present invention also provides an adhesive including the above-described polyarylene ether compound.

BEST MODES FOR CARRYING OUT THE INVENTION

Figure 1:
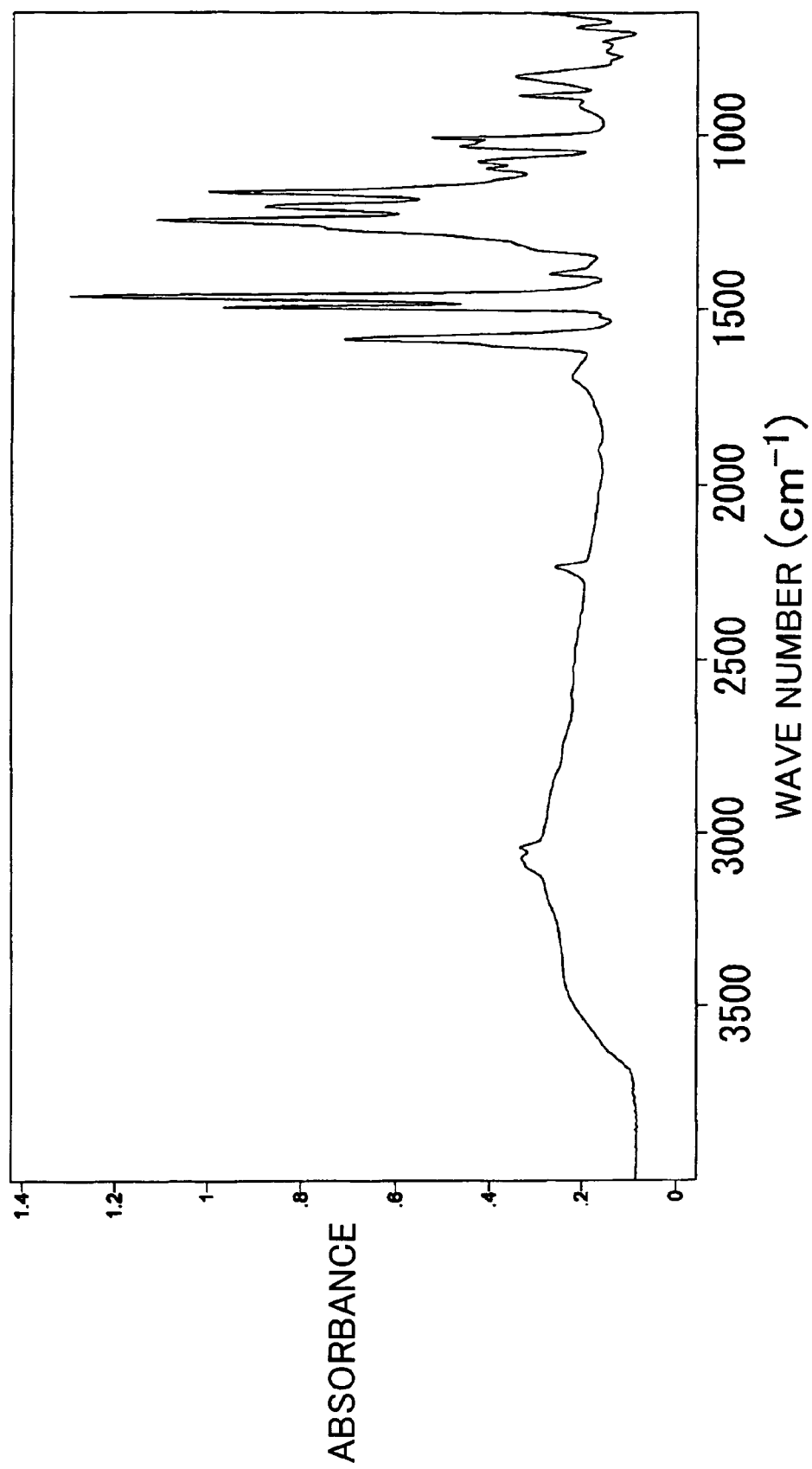
FIG. 1 is a chart showing the IR spectrum of a sulfonated polyarylene ether that has been obtained when S-DCDPS:DCBN=44:56.

The present invention provides a polyarylene ether-based compound where a sulfonic acid is introduced to an aromatic ring so as to obtain a polymer material which is excellent in dimensional stability at a high temperature, heat resistance, processability and ion conductivity and which is particularly useful as an ion conducting membrane, and a polyarylene ether-based compound that contains a sulfonic group according to the present invention is particularly characterized in that its dimensions barely change or the compound does not flow, even under conditions of high temperature and high humidity. That is to say, a 3,3'-disulpho-4,4'-dichlorodiphenylsulfone derivative is used as a monomer where a sulfonic group is introduced to an electron withdrawing aromatic ring so as to synthesize polyarylene ether, and thereby, a polymer where the sulfonic group is difficult to eliminate even at a high temperature can be provided. A the same time, the invention is characterized in that a polyarylene ether compound having a high degree of polymerization can be obtained in a short period of time in spite of the utilization of a 3,3'-disulpho-4, 4'-dichlorodiphenylsulfon derivative, in the case where dihalogen benzonitrile is used together with a less reactive 3,3'-disulpho-4,4'-dichlorodiphenylsulfone derivative.

Also according to the present invention, a particular amount or an amount higher than this amount of dioxybiphenylene structure unit is introduced into the polymer structure of a polyarylene ether-based compound where a sulfonic acid is introduced to an aromatic ring, and thereby, the above-described object can be achieved.

Though in general, it is necessary to introduce a large amount of a sulfonic group in order for the aromatic polyether compound to which the sulfonic group is introduced to exhibit ion conductivity, the introduction of the sulfonic group increases swelling of the polymer at the same as it enhances ion conductivity, making it easy for a problem with the operation of the compound as a fuel cell in a condition of high temperature to arise. According to the present invention, a particular amount or an amount higher than this amount of dioxybiphenylene structure unit is introduced to the polymer, and thereby, swelling can be suppressed, even in the case where the ratio of introduction of a sulfonic group is increased in order to exhibit a high ion conductivity, and in particular, it has been found that the polymer has properties such that the dimensional stability becomes apparent at a high temperature. In addition, excellent properties are exhibited in the processability.

The present invention also provides a composition that includes a polybenzimidazole-based compound in addition to a polyarylene ether-based compound that contains a sulfonic group. As a result of this, a polymer electrolyte membrane which can be formed by a simple membrane formation process, which exhibits high ion conducting properties, and where swelling of the membrane under high temperature and high humidity is limited can be obtained. In the following, the present invention is described in further detail.

(Polyarylene Ether Based Compound)

A sulfonic group containing polyarylene ether-based compound according to the present invention includes components which are represented in the following general formula (1) and general formula (2):

(1)

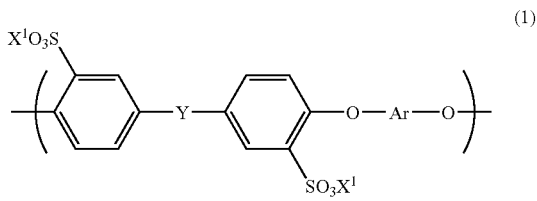

-continued

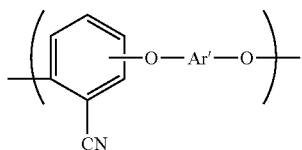
(2)

Here, Ar indicates a divalent aromatic group, Y indicates a sulfone group or a ketone group, $X^1$ indicates H or a monovalent cation species, and Ar' indicates a divalent aromatic group.

In addition, a sulfonic group containing polyarylene ether-based compound according to the present invention may include a structure unit other than those represented in the above-described general formula (1) and general formula (2). At this time, it is preferable for the structure unit other than those represented in the above-described general formula (1) and general formula (2) to be 50 wt % or less of the polyarylene ether to which sulfonic acid is introduced according to the present invention. By adjusting the amount to 50 wt % or less, the properties of the sulfonic group containing polyarylene ether-based compound according to the present invention can be sufficiently exhibited.

A sulfonic group containing polyarylene ether-based compound according to the present invention is also a compound having a structure which includes 52 wt % or more of a dioxybiphenylene unit (—O-Ph-Ph-O—) in the polymer structure, and to which a sulfonic group is introduced. A polyarylene ether-based compound according to the present invention is a polymer primarily formed of an aromatic ring that includes an ether bond as the bond type where aromatic ring units are coupled, and in addition to the ether bond, a bond type which is generally utilized for the formation of an aromatic group-based polymer, such as a direct bond, ketone, sulfone, sulfide, a variety of alkylene, imide, amide, ester and urethane may exist. It is preferable for one or more ether bonds to exist per repeated unit in the main component, and it is particularly preferable for two or more ether bonds to exist. The aromatic ring may include a hetero ring in addition to a hydrocarbon-based aromatic ring. In addition, the aromatic ring unit may have an arbitrary substitute group, such as a hydrocarbon-based group, which is, for example, an alkyl group, an alkoxy group, an aromatic group or an allyloxy group, a halogen group, a nitro group, a cyano group, an amino group, a halogenated alkyl group, a carboxyl group, a phosphonic group, and a hydroxyl group.

A sulfonic group containing polyarylene ether-based compound according to the present invention has a structure where a sulfonic group is introduced to an aromatic polyether-based polymer that contains 52 wt % or more of a dioxybiphenylene unit (of which the molar weight per unit is 184.19) in the polymer structure. That is to say, the compound has a structure where a sulfonic group is introduced to an aromatic polyether-based polymer that contains 52 wt % or more of a dioxybiphenylene unit in a skeleton structure from which the bonded sulfonic group has been removed. The aromatic polyether-based polymer contains 52 wt % or more of a dioxybiphenylene unit, and thereby, swelling of the compound due to humidity is small, even in the case an amount of a sulfonic group is necessary for obtaining sufficient ion conductivity is introduced, and the compound exhibits excellent properties particularly in the dimensional stability under high temperature and high humidity. It is more preferable for 54 wt % or more of the biphenylene unit to be contained in the compound. In the case where there is less than 52 wt % of the biphenylene unit, change in the dimensions due to swelling becomes greater under the conditions of high temperature and high humidity, in the case where a sulfonic group is introduced under the same conditions. Here, "sulfonic group is introduced" means that it may be directly introduced to an aromatic ring in the polymer, or that it may be introduced via a substitute group of the aromatic ring.

It is particularly preferable for a sulfonic group containing polyarylene ether-based compound according to the present invention to introduce the components represented in the following general formula (3) and general formula (4). In the case where the compound has a biphenylene structure, it becomes excellent in the dimensional stability in the conditions of high temperature and high humidity, and at the same time, the toughness of the film is enhanced.

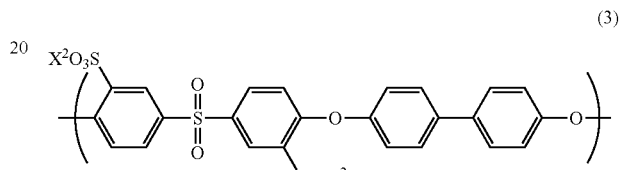
(3)

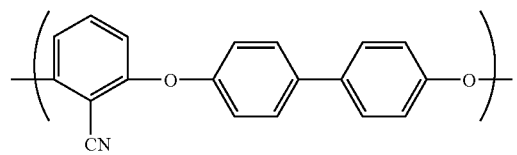
(4)

Here, $X^2$ indicates H or a monovalent cation species.

A polyarylene ether-based compound according to the present invention can contain compounds which have the following general formulas (5) and (6), together with other components, if necessary.

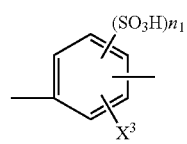
(5)

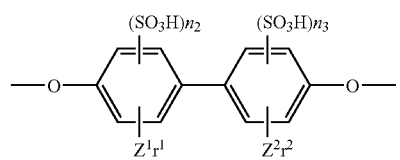
(6)

Here, in formulas (5) and (6), $n_1$, $n_2$ and $n_3$ indicate the number of bonds of sulfonic groups per aromatic ring, where $n_1$, $n_2$ and $n_3$ are, respectively, integers from 0 to 2, and $n_2+n_3$ is an integer from 1 to 4. That is to say, two or less sulfonic groups may be introduced to the configuration unit represented in formula (5). Meanwhile, it is necessary for at least one sulfonic group to be introduced to the configuration unit represented in formula (6), and in addition, it is necessary for the number of sulfonic groups that have been introduced to one aromatic ring to be two or less. In the case where three or more sulfonic groups are introduced to one aromatic ring, a problem may occur where water resistance due to swelling or the like caused by water at the time when the temperature is high is reduced. In the configuration unit represented in formula (5), $X^3$ is one or more types of functional groups selected from the group consisting of —CN, —COOY$^1$ and —CONR$_2$, where Y$^1$ represents hydrogen, a metal atom or a variety of ammonium groups, and R indicates one or two types of groups selected from hydrogen and alkyl groups. That is to say, a cyano group, a carboxyl group, an amide group or a derivative thereof, in addition to a sulfonic group, may be coupled to the configuration unit represented in formula (5). From among these, cases where a cyano group is included as at least a portion of the compound is preferable. In addition, though the respective positions of bonds are not particularly limited, a paraphenylene group or a metaphenylene group is preferable as a phenylene group. Furthermore, a 1-cyano-2,6-phenylene group is particularly preferable as the configuration unit represented in formula (5).

In addition, in the configuration unit represented in formula (6), $Z^1$ and $Z^2$ are, respectively, one or more types of functional groups selected from the group consisting of low alkyl groups having a carbon atom number of 1 to 6, low alkoxyl groups having a carbon atom number of 1 to 6, low carboxyl groups having a carbon atom number of 1 to 6, low carbonyl groups having a carbon atom number of 1 to 6, a nitro group, an amino group, a hydroxyl group, and a halogen atom, and $r^1$ and $r^2$ respectively indicate the number of bonds of $Z^1$ and $Z^2$ per aromatic ring, where $r^1$ and $r^2$ are integers from 0 to 4, and $n_3+r^1 \leq 4$ and $n_3+r^2 \leq 4$. That is to say, one or more types of functional groups selected from the group consisting of low alkyl groups having a carbon atom number of 1 to 6, low alkoxyl groups having a carbon atom number of 1 to 6, low carboxyl groups having a carbon atom number of 1 to 6, low carbonyl groups having a carbon atom number of 1 to 6, a nitro group, an amino group, a hydroxyl group, and a halogen atom, in addition to a sulfonic group, may be added to the configuration unit represented in formula (6).

A polyarylene ether-based compound according to the present invention may contain the configuration unit represented in the following general formula (7) if necessary.

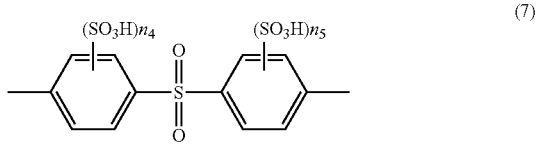

(7)

Here, $n_4$ and $n_5$ indicate the number of bonds of a sulfonic group per aroma ring, where $n_4$ and $n_5$ are, respectively, integers from 0 to 2, and $n_4+n_5$ is an integer from 1 to 4. That is to say, a case is preferable where at least one sulfonic group is introduced into the configuration unit represented in formula (7), and furthermore, it is preferable for the number of sulfonic groups that have been introduced to one aromatic ring to be 2 or less. This is because a case where no sulfonic group is added is disadvantageous in terms of having sufficient ion conductivity, and in the case three or more sulfonic groups are introduced per aromatic ring, a problem easily occurs where water resistance is reduced due to swelling caused by water at the time of high temperature.

(Sulfonic Group)

Sulfonic groups in a polyarylene ether-based compound that contains a sulfonic group according to the present invention may be directly introduced to the aromatic ring, or may be introduced via a substitute group of the aromatic ring. The sulfonic group may exist as an acid type with protons, or may exist as a variety of salts, such as a metal salt and an amine-based salt.

In a polyarylene ether-based compound that contains a sulfonic group according to the present invention, it is preferable for the sulfonic group content to be in a range from 0.3 meq/g to 3.5 meq/g at the time when the above-described components represented in general formulas (1) and (2) are contained. In the case where the content is lower than 0.3 meq/g, the compound tends not to exhibit sufficient ion conductivity when utilized as an ion conducting membrane, and in the case where the content exceeds 3.5 meq/g, swelling of the membrane becomes too large when the ion conducting membrane is placed in conditions of high temperature and high humidity, and thus, the compound tends to become unsuitable for use.

In addition, according to the present invention, in the case where the skeleton structure, from which sulfonic groups that have been bonded to the polyarylene ether-based compound are removed, contains 52 wt % or more of dioxybiphenylene units, it is preferable for a sulfonic group content in the range from 0.2 meq/g to 6.0 meq/g to have been introduced. In the case where the content is lower than 0.2 meq/g, the compound does not exhibit sufficient ion conductivity. In the case where the content exceeds 6.0 meq/g, water resistance tends to be reduced. Within this range, it is preferable for the content to be in a range from 1.0 meq/g to 3.0 meq/g, and it is particularly preferable for the content to be in a range from 1.5 meq/g to 2.3 meq/g.

Here, the sulfonic group content can be empirically found by means of titration.

(Polymer Components and Manufacturing Method for Polymer)

A polyarylene ether-based compound according to the present invention can be synthesized by utilizing an aromatic nucleophilic substitution reaction between an activated dihalogenated aromatic group compound and an aromatic dihydroxy compound, or an aromatic nucleophilic substitution of a halogenated aromatic hydroxyl compound. A sulfonic group can be introduced to a polymer by introducing a sulfonic group as at least one type of monomer, or by means of a reaction where an appropriate sulfonating agent is used after polymerization in the form of an aromatic polyether. Here, "activated" in the activated dihalogenated aromatic compound means that the reactivity of the aromatic nucleophilic substitution reaction has been enhanced due to the existence of an electron withdrawing group.

Though the structure of the activated dihalogenated aromatic compound that can be utilized in the aromatic nucleophilic substitution reaction is not particularly limited, 4,4'-dichlorodiphenylsulfone, 4,4'-difluorodiphenylsulfone, 4,4'-dichlorodiphenilketone, 4,4'-dipfluorodiphenylketone, 2,6-dichlorobenzonitrile, 2,6-difluorobenzonitrile, 2,4-dichlorobenzonitrile, 2,4-difluorobenzonitrile, 2,5-dichlorobenzonitrile, 2,5-difluorobenzonitrile and the like can be cited. It is preferable to use 2,6-dichlorobenzonitrile as a monomer for introducing a cyanophenylene group. In addition, in the case where no biphenylene unit is included in the activated dihalogenated aromatic compound, it is particularly preferable to use a dihalogenated aromatic compound having a low molecular weight. These activated dihalogenated aromatic compounds can be utilized by themselves, and it is possible to use a number of dihalogenated aromatic compounds together.

According to the present invention, 4,4'-biphenol, bis(4-hydroxyphenyl) sulfone, 1,1-bis(4-hydroxyphenyl) ethane, 2,2-bis(4-hydroxyphenyl) propane, bis(4-hydroxyphenyl) methane, 2,2-bis(4-hydroxyphenyl) butane, 3,3-bis(4-hydroxyphenyl) pentane, 2,2-bis(4-hydroxy-3,5-dimethylphenyl) propane, bis(4-hydroxy-3,5-dimethylphenyl) methane, bis(4-hydroxy-2,5-dimethylphenyl) methane, bis(4-hydroxyphenyl) phenyl methane, bis(4-hydroxyphenyl) diphenyl methane, bis(4-hydroxyphenoxy)-4,4'-biphenyl, 4,4'-bis(4-hydroxyphenyl) diphenyl ether, 9,9-bis(4-hydroxyphenyl) fluorene, 9,9-bis(3-methyl-4-hydroxyphenyl) fluorene, 2,2-bis(4-hydroxyphenyl) hexafluoropropane, hydroquinone, resorcinol and the like can be cited as an aromatic dihydroxy compound that is used in the aromatic nucleophilic substitution reaction, and in addition to this, a variety of aromatic diols that can be used for the polymerization of polyarylene ether-based compounds by means of an aromatic nucleophilic substitution reaction can be utilized. These aromatic diols can be utilized by themselves, and it is possible to use a number of aromatic diols together. In order to introduce a biphenylene unit to a polyarylene ether-based compound according to the present invention, it is particularly preferable to utilize 4,4'-biphenol.

In addition, according to the present invention, the halogenated aromatic hydroxy compound which is used in the aromatic nucleophilic substitution reaction is not particularly limited, and 4-hydroxy-4'-chlorobenzophenone, 4-hydroxy-4'-fluorobenzophenone, 4-hydroxy-4'-chlorodiphenyl sulfone, 4-hydroxy-4'fluorodiphenyl sulfone, 4-chloro-4'-(p-hydroxyphenyl) diphenyl sulfone, 4-fluoro-4'-(p-hydroxyphenyl) benzophenone and the like can be cited as examples. These can be utilized by themselves, and in addition, they can be utilized as a mixture of two or more types. Furthermore, in the reaction between the activated dihalogenated aromatic compound and the aromatic dihydroxy compound, these halogenated aromatic hydroxy compounds may both be made to react so as to synthesize an aromatic polyether-based compound.

In the case where the polyarylene ether-based compound that contains a sulfonic group is obtained by polymerizing a monomer that contains a sulfonic group by means of an aromatic nucleophilic substitution reaction, an arbitrary monomer to which a sulfonic group has been introduced may be used, and it is particularly preferable to polymerize compounds which are represented in the following general formula (13) and general formula (14) as monomers by means of an aromatic nucleophilic substitution reaction.

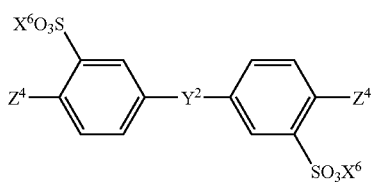

(13)

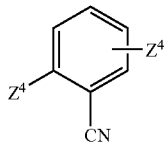

(14)

Here, $Y^2$ indicates a sulfone group or a ketone group, $X^6$ indicates a monovalent cation species, and $Z^4$ indicates chlorine or fluorine.

3,3'-disulfo-4,4'-dichlorodiphenyl sulfone, 3,3'-disulfo-4,4'-difluorodiphenyl sulfone, 3,3'-disulfo-4,4'-dichlorodiphenyl ketone, 3,3'-disulfo-4,4'-difluorodiphenyl sulfone and substances of which the sulfonic group forms a salt with a monovalent cation species can be cited as concrete examples of the compounds represented in general formula (13). The monovalent cation species may be a metal species such as sodium, potassium or the like, or a variety of amides, and is not limited to these. 2,6-dichlorobenzonitrile, 2,6-difluorobenzonitrile, 2,4-dichlorobenzonitrile, 2,4-difluorobenzonitrile, 2,5-dichlorobenzonitrile and 2,5-difluorobenzonitrile can be cited as concrete examples of the compound represented in general formula (14).

In the above-described aromatic nucleophilic substitution reaction, a variety of activated difluoro aromatic compounds and dichloro aromatic compounds can be used as a monomer, together with the above-described compounds represented in general formulas (13) and (14). 4,4'-dichlorodiphenyl sulfone, 4,4'-difluorodiphenyl sulfone, 4,4'-difluorobenzophenone, 4,4'-dichlorobenzophenone and the like can be cited as examples of these compounds, but these compounds are not limited to these examples, and other aromatic dihalogen compounds, aromatic dinitro compounds, aromatic dicyano compounds and the like which are active in the aromatic nucleophilic substitution reaction can also be utilized.

In addition, Ar in the component represented in the above-described general formula (1) and Ar' in the component represented in the above-described general formula (2) have the structures which are introduced through an aromatic nucleophilic substitution reaction between an aromatic diol monomer and a compound represented in the above-described general formula (13) or (14), generally, in the aromatic nucleophilic substitution polymerization. 4,4'-biphenol, bis (4-hydroxyphenyl) sulfone, 1,1-bis(4-hydroxyphenyl) ethane, 2,2-bis(4-hydroxyphenyl) propane, bis(4-hydroxyphenyl) methane, 2,2-bis(4-hydroxyphenyl) butane, 3,3-bis (4-hydroxyphenyl) pentane, 2,2-bis(4-hydroxy-3,5-dimethylphenyl) propane, bis(4-hydroxy-3,5-dimethylphenyl) methane, bis (4-hydroxy-2,5-dimethylphenyl) methane, bis (4-hydroxyphenyl) phenyl methane, bis(4-hydroxyphenyl) diphenyl methane, 9,9-bis(4-hydroxyphenyl) fluorene, 9,9-bis(3-methyl-4-hydroxyphenyl) fluorene, 2,2-bis(4-hydroxyphenyl) hexafluoropropane, hydroquinone, resorcinol and the like can be cited as examples of the above-described aromatic diol monomers, and in addition to these, a variety of aromatic diols which can be used in the polymerization for a polyarylene ether-based compound by means of an aromatic nucleophilic substitution reaction can be utilized. These aromatic diols can be utilized by themselves, and it is also possible to use a number of aromatic diols together.

In the case where the polyarylene ether-based compound that contains a sulfonic group according to the present invention is obtained through polymerization in an aromatic nucleophilic substitution reaction, the polymer can be obtained through a reaction between an activated difluoro aromatic compound and/or dichloro aromatic compound that includes compounds represented in the above-described general formula (13) and general formula (14), and an aromatic diols, under the existence of a basic compound. Though the polymerization can be carried out in a temperature range from 0° C. to 350° C., a temperature between 50° C. and 250° C. is preferable. In the case where the temperature is lower than 0° C., the reaction tends not to sufficiently occur, and in the case where the temperature is higher than 350° C., the polymer tends to start decomposing. The reaction can be made to occur without a solvent, but it is preferable to make the reaction occur in a solvent. N-methyl-2-pyrrolidone, N,N-dimethyl acetamide, N,N-dimethyl formamide, dimethyl sulfoxide, diphenylsulfone, sulfolane and the like can be cited as solvents that can be utilized, but the solvent is not limited to these, and any solvent may be utilized, as long as it can be utilized as a stable solvent in the aromatic nucleophilic substitution reaction. These organic solvents may be utilized either by themselves or in a mixture of two or more types.

Sodium hydroxide, potassium hydroxide, sodium carbonate, potassium carbonate, sodium hydrogen carbonate, potassium hydrogen carbonate and the like can be cited as the basic compound, and the basic compound is not limited to these, but rather, any basic compound may be utilized, as long as it can convert an aromatic diol to an active phenoxide structure. In some aromatic nucleophilic substitution reactions, water is produced as a byproduct. At this time, toluene or the like can be made to coexist in the reaction system, irrespectively of the polymerization solvent, so that water can be removed from the system as an azeotrope. A water absorbing material, such as a molecular sieve, can be utilized according to a method for removing from the system. In the case where the aromatic nucleophilic substitution reaction is made to occur in a solvent, it is preferable to prepare monomers so that the concentration of the obtained polymer becomes 5 wt % to 50 wt %. In the case where the concentration is lower than 5 wt %, the degree of polymerization tends not to increase. Meanwhile, in the case where the concentration exceeds 50 wt %, the viscosity in the reaction system becomes too high, and the post process of the reactants tends to become difficult. After the completion of the polymerization reaction, the solvent is removed from the reaction solution through vaporization, and the residue is washed if necessary, and thereby, a desired polymer can be obtained. Alternatively, the reaction solution is added to a solvent where the solubility of the polymer is low, and thereby, the polymer can be precipitated as a solid, and thus, the polymer can be obtained through filtration of the precipitate.

A polyarylene ether-based compound according to the present invention can be synthesized by means of an aromatic electrophilic substitution reaction known as the Friedel-Crafts reaction. General substances which are utilized in this reaction, such as diphenyl ether, 1,4-diphenoxybenzene, 1,3-diphenoxybenzene, 4,4'-diphenoxydiphenyl, 3,3'-diphenoxydiphenyl, bis(4-phenylphenoxy)-1,4-benzene, bis(4-phenylphenoxy)-4,4'-biphenyl, 4-phenoxybiphenyl, bis(4-phenoxyphenyl) ether, bis(3-phenoxyphenyl) ether, 4,4'-bis(4-phenoxyphenyl) diphenyl ether, 4,4'-diphenoxybenzophenone, 1,4-bis(4-phenoxybenzoyl)benzene, 1,3-bis(4-phenoxy benzoyl) benzene, bis[4-(4-phenoxybenzoyl) phenyl] ether, bis[4-(3-phenoxybenzoyl) phenyl] ether, biphenyl, terphenyl, quaterphenyl or a combination of two or more types from among these, are utilized as aromatic monomers that receive electrophilic attack at this time. From among these, it is preferable to use a substance that contains the dioxybiphenylene structure in its structure, such as 4,4'-bis(4-phenoxyphenyl) diphenyl ether, as the main component.

An aromatic dicarbonyl chloride can be utilized as a monomer that attacks in an electrophilic manner. Substances which are generally utilized in this reaction, such as terephthaloyl chloride, isophthaloyl chloride, 2,6-naphthalene dicarbonyl chloride, 1,5-naphthalene dicarbonyl chloride, 4,4'-biphenyl dicarbonyl chloride, diphenyl ether-3,3'-dicarboxylic acid, diphenyl ether-4,4'-dicarboxylic acid, benzophenone-4,4'-dicarboxylic acid or a combination of two or more types from among these can be used as examples of these. In addition, polymerization can be carried out by additionally using a self-condensation type monomer, such as 4-phenoxybenzoyl chloride.

Though conditions of the above-described aromatic electrophilic substitution reaction are not particularly limited, the Friedel-Crafts reaction, with a catalyst of aluminum chloride, for example, can be used. At this time, a halogen containing hydrocarbon, such as 1,2-dichloroethane, dichloromethane, 1,1,2,2-tetrachloroethane, chloroform; nitrobenzene; or carbon disulfide, can be utilized as a solvent. In addition to these, other solvent systems, such as hydrogen fluoride/boron trifluoride or the like, and other catalyst systems, such as zinc chloride, aluminum bromide, ferric chloride, titanium tetrachloride or the like, can also be used. In addition, dehydrating condensation polymerization can be carried out in polyphosphoric acid or the like, using an aromatic dicarboxylic acid as a monomer.

According to the present invention, when a polyarylene ether-based compound is synthesized using a monomer where a sulfonic group is not introduced to a monomer that provides the dioxybiphenylene structure, a sulfonation reaction is made to occur in the obtained polyarylene ether-based compound, and thereby, a sulfonated polyarylene ether-based compound of the present invention can be obtained. At this time, it is preferable to obtain a polymer by means of an aromatic nucleophilic substitution reaction that includes compounds represented in the general formula (15), together with general formula (16), shown below, as monomers, so that the obtained polymer is sulfonated.

(15)

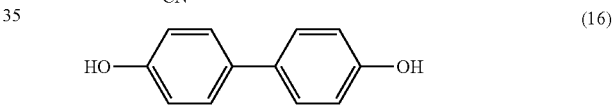

(16)

In formula (15), $X^7$ indicates chlorine or fluorine.

In either an aromatic nucleophilic substitution reaction or an aromatic electrophilic substitution reaction, a polyarylene ether-based compound that is obtained in a form which does not have a sulfonic group can be converted to a sulfonic group containing polyarylene ether-based compound by making a sulfonation reaction occur. In addition, a sulfonic group containing polyarylene ether-based compound can be obtained by making a sulfonation reaction occur in a polyarylene ether-based compound that contains configuration units where either $n_2$ or $n_3$ is 0 in the above-described general formula (6). Though a sulfonation agent that is used to manufacture a polyarylene ether-based compound that contains a sulfonic group is not particularly limited, concentrated sulfuric acid or fuming sulfuric acid (disclosed in, for example, Solid State Ionics, 106, P. 219 (1998)), chlorosulfuric acid (disclosed, for example, in J. Polym. Sci., Polym. Chem., 22, P. 295 (1984)), a sulfur trioxide complex (disclosed in, for example, J. Polym. Sci., Polym. Chem., 22, P. 721 (1984), J. Polym. Sci., Polym. Chem., 23, P. 1231 (1985) and the like) and the like are appropriate for use.

In addition to the above-described known sulfonation agent, it is also possible to use sulfonation agents such as those described in Japanese Patent No. 2884189, that is to say, 1,3,5-trimethyl benzene-2-sulfonic acid, 1,3,5-trimethyl benzene-2,4-disulfonic acid, 1,2,4-trimethyl benzene-5-sulfonic acid, 1,2,4-trimethyl benzene-3-sulfonic acid, 1,2,3-trimethyl benzene-4-sulfonic acid, 1,2,3,4-tetramethyl benzene-5-sulfonic acid, 1,2,3,5-tetramethyl benzene-4-sulfonic acid, 1,2,4,5-tetramethyl benzene-3-sulfonic acid, 1,2,4,5-tetramethyl benzene-3,6-disulfonic acid, 1,2,3,4,5-pentamethyl benzene-6-sulfonic acid, 1,3,5-tiethyl benzene-2-sulfonic acid, 1-ethyl-3,5-dimethyl benzene-4-sulfonic acid, 1-ethyl-3,4-dimethyl benzene-6-sulfonic acid, 1-ethyl-2,5-dmethyl benzene-3-sulfonic acid, 1,2,3,4-tetraethyl benzene-5-sulfonic acid, 1,2,4,5-tetraethyl benzene-3-sulfonic acid, 1,2,3,4,5-pentaethyl benzene-6-sulfonic acid, 1,3,5-triisopropyl benzene-2-sulfonic acid, 1-propyl-3,5-dimethyl benzene-4-sulfonic acid or the like.

From among the above-described sulfonation agents, compounds where elements in ortho positions on both sides of a sulfonic group are substituted with lower alkyl groups, such as 1,3,5-trimethyl benzene-2-sulfonic acid, 1,2,4,5-tetramethyl benzene-3-sulfonic acid, 1,2,3,5-tetramethyl benzene-4-sulfonic acid, 1,2,3,4,5-pentamethyl benzene-6-sulfonic acid, 1,3,5-trimethyl benzene-2,4-disulfonic acid, 1,3,5-triethyl benzene-2-sulfonic acid and the like are particularly preferable, and in addition, 1,3,5-trimethyl benzene-2-sulfonic acid is most preferable.

Here, at the time of the manufacture of a polyarylene ether-based compound that contains a sulfonic group according to the present invention, it is preferable to add any of these sulfonation agents in a range from 30 to 50,000 parts by weight relative to the 100 parts by weight of the polyarylene ether-based compound, and it is more preferable to add any of these sulfonation agents in a range from 50 to 10,000 parts by weight. In the case where the amount of added sulfonation agent is less than 30 parts by weight, the sulfonation reaction tends not to progress sufficiently, and in the case where the amount of added sulfonation agent exceeds 50,000 parts by weight, disposal of the sulfonation agent after the reaction tends to require a great deal of labor.

In addition, the organic solvent that is used to manufacture a polyarylene ether-based compound that contains a sulfonic group according to the present invention is not particularly limited, but rather, any solvent that is conventionally known can be utilized, as long as it dissolves a polyarylene ether-based compound and/or a sulfonation agent without negatively affecting the sulfonation reaction. Halogenated aliphatic hydrocarbons, such as chloroform, dichloromethane, 1,2-dichloroethane, trichloroethane, tetrachloroethane, trichloroethylene and tetrachloroethylene; nitro compounds, such as nitromethane and nitrobenzene; alkyl benzenes, such as trimethyl benzene, tributyl benzene, tetramethyl benzene and pentamethyl benzene; heterocyclic compounds, such as sulfolane; and linear chain, branched chain or cyclic aliphatic hydrocarbons, such as octane, decane and cyclohexane, can be cited as concrete examples of the above-described organic solvent.

These solvents may be used by themselves, or two or more types may be mixed, and the amount thereof is appropriately selected depending on the types of the polyarylene ether-based compound and the sulfonation agent, and it is usually preferable for the amount of solvent to be in a range from 100 to 2,000 parts by weight relative to the 100 parts by weight of the sulfonation agent. In the case where the amount of solvent is less than 100 parts by weight, it tends to become difficult to make the sulfonation reaction progress uniformly, and in the case where the amount of solvent exceeds 2,000 weights parts, separation of the solvent and the sulfonation agent after the reaction and the recovery of the solvent tend to require a great deal of labor.

The introduced amount of the sulfonic group can be controlled, if necessary, by setting the conditions for sulfonation, such as the type of sulfonation agent, the reaction temperature, and reaction time, for the polyarylene ether-based compound. It is preferable to make the sulfonation reaction occur at a reaction temperature in a range from −20° C. to 150° C., and for a period of time in a range from 0.1 hours to 100 hours. In the case where the reaction temperature is less than −20° C., the reaction rate of the sulfonation reaction becomes slow, and in the case where the reaction temperature exceeds 150° C., a problem arises where control of the sulfonation becomes difficult. In addition, it is preferable to make sulfonation occur under an inert gas atmosphere, such as a nitrogen gas or an argon gas, in order to obtain a polyarylene-based compound that contains a sulfonic group according to the present invention. This is in order to prevent the obtained polymer from being oxidized and deteriorated.

(Inherent Viscosity of Polymer)

In addition, it is preferable for the inherent viscosity of the polymer that has been measured according to the below described method to be 0.1 or greater in a polyarylene ether-based compound that contains a sulfonic acid according to the present invention. In the case where the inherent viscosity number is smaller than 0.1, when an ion conducting membrane is formed of the polymer, the membrane becomes too fragile. Furthermore, it is also preferable for the reduced relative viscosity to be 0.3 or greater. In the case where the reduced relative viscosity exceeds 5, a problem arises in terms of processability, in such a manner that the polymer barely dissolves, which is not preferable. Here, a polar organic solvent, such as N-methyl pyrrolidone or N,N-dimethyl acetamide, can generally be used as the solvent for measuring the inherent viscosity, and in the case where the solubility in these solvents is low, the inherent viscosity can be measured using concentrated sulfuric acid.

(Composition)

Though a polyarylene ether-based compound that contains a sulfonic group according to the present invention can be utilized as a single substance, it is preferable to utilize it in a mixture with a polybenzimidazole-based compound. In addition, a polyarylene ether-based compound according to the present invention can be utilized in combination with another polymer. This polymer is not particularly limited, and may be a polyester-based polymer, such as polyethylene terephthalate, polybutylene terephthalate or polyethylene naphthalate; a polyamide-based polymer, such as nylon 6, nylon 6,6, nylon 6,10 or nylon 12; polymethyl metacrylate; a polymetacrylic ester-based polymer; an acrylate-based resin, such as polymethyl acrylate or a polyacrylic ester-based polymer; a polyacrylic-based resin; a polymetacrylic-based resin; a variety of polyolefins, including polyethylene, polypropylene, polystylene and diene polymers; a polyurethane-based resin; a cellulose-based resin, such as cellulose acetate or ethylene cellulose; polyacrylate; aramid; polycarbonate; polyphenylene sulfide; polyphenylene oxide; polysulfone; polyether sulfone; polyether ether ketone; polyether imide; polyimide; polyamide imide; an aromatic-based polymer, such as polybenzimidazole, polybenzoxazole or polybenzothiazole; a thermosetting resin, such as an epoxy resin, a phenol resin, a novolac resin or a benzoxazine resin or the like. A composition using the above-described polybenzimidazole-based compound or a basic polymer, such as polyvinyl pyridine, is be said to be a particularly preferable combination, for increasing the dimension properties of the polymer.

According to the present invention, particularly a composition that includes a polybenzimidazole-based compound that contains an acidic group, together with a polyarylene ether-based compound of the present invention, allows a new material that exhibits excellent properties in processability, ion conductivity and the like, in addition to durability, to be obtained. In order to obtain these excellent properties, the above-described composition according to the present invention can be appropriately utilized as a material for a solid polymer electrolyte membrane for a fuel cell.

It is preferable for the polyarylene ether-based compound of the present invention that is included in the composition to be 50 wt % or more and less than 100 wt % of the composition. It is more preferable for it to be 70 wt % or more and less than 100 wt %. In the case where the content of the aromatic polyether-based compound that contains a sulfonic group of the present invention is less than 50 wt % of the resin composition, the concentration of the sulfonic group in the ion conducting membrane that includes this resin composition tends to be low, and thus unable to obtain a good ion conductivity, and in addition, the units that contain a sulfonic group tend to form discontinuous phases, thus lowering the mobility of ions that conduct.

In order to obtain a composition that contains a polyarylene ether-based compound of the present invention and a polybenzimidazole, the polybenzimidazole-based compound and the polyarylene ether-based compound of the present invention may be mixed. Then, this mixed polymer composition can be formed out from a polymerization solution, an isolated polymer, a polymer solution that has been redissolved and the like, so as to be formed into a fiber or a film according to an arbitrary method, such as extruding spinning, rolling, casting or the like. It is preferable to form the polymer from a solution in which the solute has been dissolved in an appropriate solvent, from among these formation processes. An appropriate solvent can be selected from among aprotic polar solvents, such as N,N-dimethyl acetamide, N,N-dimethyl formamide, dimethyl sulfoxide, N-methyl-2-pyrrolidone and hexamethyl phosphone amide; and strong acids, such as polyphosphoric acid, methane sulfonic acid, sulfuric acid and trifluoroacetic acid, though the solvent is not limited to these. It is particularly preferable to form the solvent of an organic solvent chosen from among these. More than one of these solvents may be utilized, if possible. In addition, an organic solvent to which a Lewis acid, such as lithium bromide, lithium chloride, aluminum chloride or the like, is added in order to increase the solubility may be used as the solvent. It is preferable for the polymer concentration in the solution to be in a range from 0.1 wt % to 50 wt %. In the case where the concentration is too low, formability becomes poor, and in the case where the concentration is too high, the processability becomes poor.

Here, the composition of the present invention may include a variety of additives, such as an antioxidant, a thermal stabilizer, a lubricant, a tackifier, a plasticizer, a cross-linking agent, a viscosity adjuster, an antistatic agent, an anti-microbial agent, an anti-foaming agent, a dispersion agent or a polymerization inhibitor, if necessary.

Polybenzimidazole-Based Compound

The polybenzimidazole-based compound that contains an acidic group according to the present invention includes the structure represented in the following formula (8).

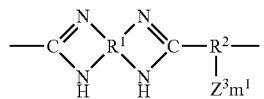

(8)

In formula (8), $m^1$ indicates an integer from 1 to 4, $R^1$ indicates a tetravalent aromatic bond unit that can form an imidazole ring, and $R^2$ indicates a divalent aromatic unit, where either of $R^1$ and $R^2$ may be a single aromatic ring, a combined body of a number of aromatic rings or a condensed ring, or may have a stable substitution group. $Z^3$ indicates a sulfonic group and/or a phosphonic group, and a portion thereof may have a basic structure.

The path for synthesizing the polybenzimidazole-based compound that includes acidic group according to the present invention which includes the structure shown in the above formula (8) is not particularly limited, and the polybenzimidazole-based compound that includes acidic group according to the present invention can usually be synthesized by means of a reaction between one or more types of compounds selected from the group consisting of aromatic tetramines that can form an imidazole ring in the compound, as well as derivatives thereof, and one or more types of compounds selected from a group of an aromatic dicarboxylic acid and derivatives thereof. At this time, a sulfonic group and a phosphonic group or their salts are introduced into the utilized dicarboxylic acid, thereby, a sulfonic group and a phosphonic group can be introduced into the obtained polybenzimidazole. Dicarboxylic acids that include a sulfonic group or a phosphonic group can be utilized by combining one or more types of these dicarboxylic acids, and it is possible to simultaneously utilize a dicarboxylic acid that contains a sulfonic group and a dicarboxylic acid that contains a phosphonic group.

Here, in the present invention, it is preferable for benzimidazole-based bond units that are components of a polybenzimidazole-based compound, aromatic dicarboxylic acid bond units that have a sulfonic group and/or a phosphonic group, aromatic dicarboxylic acid bond units that have neither a sulfonic group nor a phosphonic group, and other bond units to be bonded by means of random polymerization and/or alternating polymerization. In addition, the polymerization form of these units is not limited to one type, but rather, two or more types of polymerization forms may exist in the same compound.

From among polybenzimidazole-based compounds that contain a sulfonic group, which also include the component shown in the above formula (8), the compound that includes the bond units represented by the structures shown in the following formulas (9) and (10) as the components in the molecular ratio of $n_6$:$(1-_6)$ is particularly preferable.

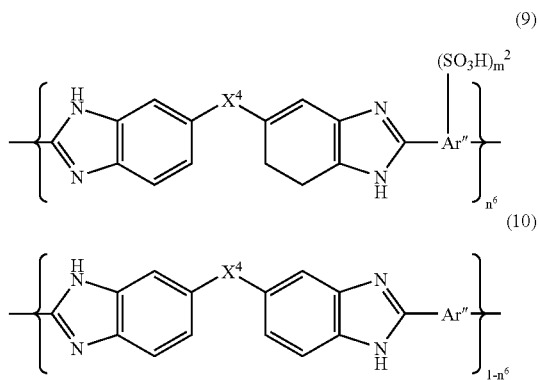

In formulas (9) and (10), $m^2$ indicates an integer from 1 to 4, Ar" indicates an aromatic bond unit, $X^4$ indicates one or more types selected from the group consisting of —O—, —$SO_2$—, $C(CH_3)_2$—, —$C(CF_3)_2$— and —OPhO—, where Ph represents a divalent aromatic bond unit. In addition, the molecular ratio satisfies the expression $0.2 \leq n_6 \leq 1.0$.

In the above formulas (9) and (10), in the case where $m_2$ is greater than 5, the water resistance of the obtained polymer tends to be poor, and in the case where the molecular ratio $n_6$ is smaller than 0.2, the obtained polymer tends not to exhibit sufficient ion conductivity.

Concrete examples of aromatic tetramines which provide a polybenzimidazole-based compound that contains a sulfonic group which includes the component shown in the above formula (8) are not limited, and, for example, 1,2,4,5-tetraaminobenzene, 3,3'-diaminobenzidine, 3,3',4,4'-tetraamino diphenyl ether, 3,3',4,4'-tetraamino diphenyl thioether, 3,3',4,4'-tetraamino diphenyl sulfone, 2,2-bis(3,4-diaminophenyl) propane, bis(3,4-diaminophenyl) methane, 2,2-bis(3,4-diaminophenyl) hexafluoropropane, 1,4-bis(3,4-diaminophenoxy) benzene, as well as derivatives of these, can be cited. From among these, 3,3',4,4'-tetraamino diphenyl ether, 3,3',4,4'-tetraamino diphenyl sulfone, 2,2-bis(3,4-diaminophenyl) propane, 2,2-bis(3,4-diaminophenyl) hexafluoropropane, 1,4-bis(3,4-diaminophenoxy) benzene, as well as derivatives of these which can form the bond unit that is represented in formula (10), are particularly preferable.

Salts formed of acids such as hydrochloric acid, fluoric acid, and phosphoric acid, can be cited as concrete examples of the derivatives of these aromatic tetramines. In addition, these compounds can be utilized by themselves, or more than one type can be simultaneously utilized. Furthermore, these compounds may include a known anti-oxidant, such as tin (II) chloride or phosphite compounds, if necessary.

The dicarboxylic acid that contains one to four sulfonic groups in an aromatic-based dicarboxylic acid can be selected as the dicarboxylic acid that contains a sulfonic group that is provided to have the structure in the above formula (8), and, for example, dicarboxylic acids that contain a sulfonic acid, such as 2,5-dicarboxybenzene sulfonic acid, 3,5-dicarboxybenzene sulfonic acid, 2,5-dicarboxy-1,4-benzene disulfonic acid, 4,6-dicarboxy-1,3-benzene disulfonic acid, 2,2'-disulfo-4,4'-biphenyl dicarboxylic acid, 3,3'-disulfo-4,4'-biphenyl dicarboxylic acid, as well as derivatives of these, can be cited as concrete examples. Alkaline metal salts, such as those of sodium and potassium, ammonium salts, alkyl ammonium salts and the like, can be cited as derivatives of the dicarboxylic acid that contains a sulfonic acid. The structure of the dicarboxylic acids that contain a sulfonic acid is not particularly limited to the above. $m^1$ in the above formula (8) is selected from integers from 1 to 4. In the case where $m^1$ is 5 or greater, the water resistance of the polymer tends to be poor, which is not preferable.

The dicarboxylic acids that contain a sulfonic group can be introduced by themselves, and in addition, in copolymer form, together with a dicarboxylic acid that contains neither a sulfonic group nor a phosphonic group. As for the examples of the dicarboxylic acid that can be utilized together with a dicarboxylic acid that contains a sulfonic group, general dicarboxylic acids which have been known as polyester materials, such as terephthalic acid, isophthalic acid, naphthalene dicarboxylic acid, diphenyl ether dicarboxylic acid, diphenyl sulfone dicarboxylic acid, biphenyl dicarboxylic acid, terphenyl dicarboxylic acid and 2,2-bis(4-carboxyphenyl) hexafluoropropane, can be utilized, and the dicarboxylic acid is not limited to those which are illustrated herein. Though the purity of the dicarboxylic acid that contains a sulfonic group is not particularly limited, 98% or greater is preferable, and 99% or greater is more preferable. A polyimidazole that has been polymerized using a dicarboxylic acid that contains a sulfonic acid as a material tends to exhibit a low degree of polymerization in comparison with the case where a dicarboxylic acid that does not contain a sulfonic group is used, and therefore, it is preferable to use a dicarboxylic acid that contains a sulfonic group of which the purity is as high as possible. In the case where a dicarboxylic acid that does not contain a sulfonic group is utilized together with a dicarboxylic acid that contains a sulfonic acid, the effects of the sulfonic acid can be clearly exhibited by adjusting the amount of the dicarboxylic acid that contains a sulfonic acid to 20 mol % or higher in the total dicarboxylic acid. In order for the effects of the sulfonic acid to be significantly exhibited, it is preferable for the amount of dicarboxylic acid that contains a sulfonic acid to be 50 mol % or higher. In the case where the content of aromatic dicarboxylic acid that has a sulfonic acid is less than 20 mol %, the conductivity of the polybenzimidazole-based compound tends to become low, which is not appropriate for the material of the solid polymer electrolyte.

A polybenzimidazole-based compound that contains a phosphonic group and includes bond units which are represented in the structures shown in the following formulas (11) and (12) as the components in the molecular ratio of $n_7:(1-n_7)$ is particularly preferable as the polybenzimidazole-based compound that contains a phosphonic group and that includes the component shown in the above formula (8).

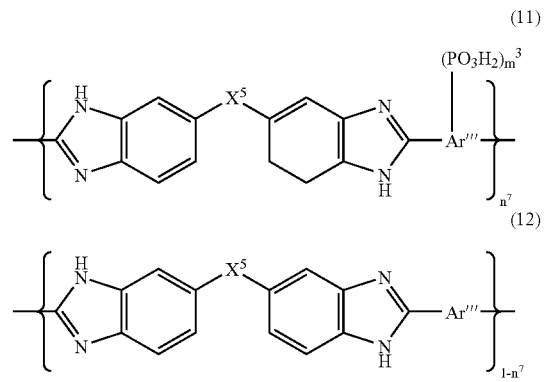

In formulas (11) and (12), $m^3$ indicates an integer from 1 to 4, Ar''' indicates an aromatic bond unit, $X^5$ indicates one or more types selected from the group consisting of —O—, —$SO_2$—, —S—, —$CH_2$— and —OPhO—, where Ph indicates a divalent aromatic bond unit. In addition, the molecular ratio satisfies the expression $0.2 \leq n^7 \leq 1.0$.

In the above formulas (11) and (12), in the case where $m^3$ is greater than 5, the water resistance of the obtained polymer tends to be poor, and in the case where the molecular ratio $n^7$ is smaller than 0.2, the obtained polymer tends not to exhibit sufficient ion conductivity.

The aromatic tetramines that provide the polyimidazole that contains a phosphonic group represented in the above formula (8) are not particularly limited, and for example, 1,2,4,5-tetraamino benzene, 3,3'-diamino benzidine, 3,3',4,4'-tetraamino diphenyl ether, 3,3',4,4'-tetraamino diphenyl thioether, 3,3',4,4'-tetraamino diphenyl sulfone, 2,2-bis(3,4-diaminophenyl) propane, bis(3,4-diaminophenyl) methane, 2,2-bis(3,4-diaminophenyl) hexafluoropropane, 1,4-bis(3,4-diaminophenoxy) benzene, as well as derivatives of these, can be cited as concrete examples of the aromatic tetramines. From among these, 3,3',4,4'-tetraamino diphenyl ether, 3,3',4,4'-tetraamino diphenyl sulfone, 3,3',4,4'-tetraamino diphenyl thioether, bis(3,4-diaminophenyl) methane, 1,4-bis(3,4- diaminophenoxy) benzene, as well as deviates of these which can form the bond unit that is represented in the above formula (9) are particularly preferable.

Salts formed of acids such as hydrochloric acid, fluoric acid, and phosphoric acid, can be cited as concrete examples of the derivatives of these aromatic tetramines. In addition, these compounds can be utilized by themselves, or more than one type can be simultaneously utilized. Furthermore, these compounds may include a known anti-oxidant, such as tin (II) chloride or phosphite compounds, if necessary.

The aromatic dicarboxylic acid that has a phosphonic group and is used at the time when the polybenzimidazole-based compound that has a phosphonic group, shown in the above formula (11), is synthesized, as well as derivatives thereof, is not particularly limited, but rather, a compound that has one to four phosphonic groups in an aromatic dicarboxylic acid skeleton can be appropriately utilized. As concrete examples, aromatic dicarboxylic acids that have a phosphonic group, such as 2,5-dicarboxyphenyl phosphonic acid, 3,5-dicarboxy phenyl phosphonic acid, 2,5-bisphosphonoterephthalic acid, as well as derivatives of these, can be cited. In the case where an aromatic dicarboxylic acid skeleton has 5 or more phosphonic groups, the water resistance of the polymer tends to be poor, which is not preferable.

Here, alkaline metal salts, such as those of sodium and potassium, ammonium salt, alkyl ammonium salt and the like, can be cited as phosphonic derivatives of these aromatic dicarboxylic acids that have phosphonic groups. In addition, these compounds may be utilized by themselves, or more than one type from these compounds can be simultaneously used. Furthermore, these compounds may include a known anti-oxidant, such as tin (II) chloride or a phosphite compound, if necessary.

Thus, though the structure of the aromatic dicarboxylic acids that have a phosphonic group are not limited to these, aromatic dicarboxylic acids that have a phosphonic group of the phenyl phosphonic group type, as shown herein, are preferable.

Though the purity of the aromatic dicarboxylic acids that have a phosphonic group and are used for synthesizing a polybenzimidazole-based compound according to the present invention is not particularly limited, 97% or greater is preferable, and 98% or greater is more preferable. The polybenzimidazole-based compounds that have been polymerized by using aromatic dicarboxylic acids that have a phosphonic group as a material tend to exhibit a low degree of polymerization in comparison with a case where aromatic dicarboxylic acids that have neither a sulfonic group nor a phosphonic group are used as materials, and therefore, it is preferable to use an aromatic dicarboxylic acid that has a phosphonic group of which the purity is as high as possible. That is to say, in the case where the purity of the aromatic dicarboxylic acid is less than 97%, the obtained polybenzimidazole-based compound tends to have a low degree of polymerization, and is not suitable as a material for a solid polymer electrolyte.

The above-described aromatic dicarboxylic acids that have a phosphonic group may be utilized by themselves, or may be used for a copolymerization reaction together with an aromatic dicarboxylic acid that contains neither a sulfonic group nor a phosphonic group, and thereby, a polybenzimidazole-based compound that has a phosphonic group according to the present invention may be synthesized. Though an aromatic dicarboxylic acid that does not have a phosphonic group nor sulfonic group that can be utilized together with an aromatic dicarboxylic acid that has a phosphonic group, are not particularly limited, general aromatic carboxylic acids which are known as polyester materials, such as terephthalic acid, isophthalic acid, naphthalene dicarboxylic acid, diphenyl ether dicarboxylic acid, diphenyl sulfone dicarboxylic acid, biphenyl dicarboxylic acid, terphenyl dicarboxylic acid, and 2,2-bis(4-carboxyphenyl) hexafluoropropane, can be utilized.

In addition, these compounds may be utilized by themselves, or more than one type from these can be simultaneously utilized. Furthermore, these compounds may include an antioxidant, such as tin (II) chloride or a phosphite compound, if necessary.

In the case where an aromatic dicarboxylic acid that has neither a sulfonic group nor a phosphonic group is utilized together with an aromatic dicarboxylic acid that has a phosphonic acid in order to synthesize a polybenzimidazole-based compound according to the present invention, the content of the aromatic dicarboxylic acid that has a phosphonic group is adjusted to 20 mol % or more in the aromatic dicarboxylic acid when mixed therein, and thereby, excellent effects of the polybenzimidazole-based compound according to the present invention, which has a phosphonic group, can be clearly exhibited. In addition, in order for the polybenzimidazole-based compound according to the present invention, which has a phosphonic group, to exhibit significant effects, it is further preferable for the content of the aromatic dicarboxylic acid that has a phosphonic group to be 50 mol % or more in the mixture. In the case where the content of the aromatic dicarboxylic acid that has a phosphonic group is less than 20 mol %, the conductivity of the polybenzimidazole-based compound according to the present invention tends to become low, making the compound unsuitable for the material of a solid polymer electrolyte.

Here, the above-described aromatic dicarboxylic acids that have a sulfonic group and aromatic dicarboxylic acids that have a phosphonic group may be utilized by themselves, or may be used together for a copolymerization reaction, and thereby, a polybenzimidazole-based compound that has a sulfonic group and/or a phosphonic group according to the present invention may be synthesized.

In addition, at this time, the above-described aromatic dicarboxylic acids that have a sulfonic group and aromatic dicarboxylic acids that have a phosphonic acid may be mixed for use as a mixture of only these, or may be used for a copolymerization reaction together with an aromatic dicarboxylic acid that contains neither a sulfonic group nor a phosphonic group, and thereby, a polybenzimidazole-based compound that has a sulfonic group and/or a phosphonic group of the present invention may be synthesized.

Though the method for synthesizing a polybenzimidazole-based compound that has a sulfonic group and/or a phosphonic group by using one or more types of compounds which are selected from the group consisting of the above-described aromatic tetramines and derivatives of these, and one or more types of compounds selected from the group consisting of the aromatic dicarboxylic acids and derivatives of these is not particularly limited, a polybenzimidazole compound can be synthesized by means of dehydration and cyclization polymerization, using a polyphosphoric acid as a solvent, as described in J. F. Wolfe, Encyclopedia of Polymer Science and Engineering, $2^{nd}$ Edition, Vol. 11, p. 601 (1988). Polymerization can be made to occur in the same mechanism, where a system of a mixed solvent of methane sulfonic acid/phosphorous pentoxide is used instead of polyphosphoric acid. Here, polymerization using a polyphosphoric acid which is generally often utilized is preferable, in order to synthesize a polybenzimidazole-based compound that has a high thermostability.

Furthermore, in order to obtain a polybenzimidazole-based compound according to the present invention, a method can be utilized according to which, for example, a precursor polymer having a polyamide structure or the like is synthesized in advance by means of a reaction in an appropriate organic solvent or by the melting of mixed material monomers, and after that, the precursor polymer is converted to have a polybenzimidazole structure, which is the object, of cyclization reaction by means of appropriate heat treatment or the like.

In addition, reaction time at the time when the polybenzimidazole-based compound of the present invention is synthesized should not be generally limited, because the optimal reaction time depends on the combination of individual material monomers. As a result of long reaction time, as has conventionally been the case, in some cases, a polybenzimidazole-based compound having low thermal stability may be obtained from a system that includes a material monomer, such as an aromatic dicarboxylic acid that has a sulfonic group or a phosphonic group, and in such a case, it is preferable to shorten the reaction time, though not so short as to prevent the effects of the present invention to be obtained. By shortening the reaction time in such a manner, a polybenzimidazole-based compound that has a sulfonic group and/or a phosphonic group can be obtained in the condition of having high thermal stability.

In addition, the reaction temperature at the time when the polybenzimidazole-based compound of the present invention is synthesized should not be generally limited, because the optimal reaction temperature depends on the combination of individual material monomers. As a result of a reaction at a high temperature, as has conventionally been the case, in some cases, a polybenzimidazole-based compound where the amount of introduced sulfonic group and/or phosphonic group cannot be controlled may be obtained from a system that includes material monomers, such as an aromatic dicarboxylic acid that has a sulfonic group and/or a phosphonic group, and in such a case, it is preferable to lower the reaction temperature, though not so low as to prevent the effects of the present invention to be obtained. By lowering the reaction temperature in such a manner, the control over the introduced amount of a sulfonic group and/or phosphonic group into the polybenzimidazole-based compound which has a large amount of an acidic group is made possible, so that this compound can be obtained in the condition of high thermal stability.

In addition, in the case where the polybenzimidazole-based compound according to the present invention after being synthesized is formed of more than one type of material monomer which forms repeating units, these repeating units are bonded by means of random polymerization, and/or alternating polymerization, and thereby, the material of the polymer electrolysis membrane exhibits a stable performance. Here, in order to synthesize the polybenzimidazole-based compound according to the present invention in the polymerization form of random polymerization and/or alternating polymerization, it is preferable to prepare all of the monomer materials according to a method where the mixture ratios thereof are set so as to match with the equivalent from the initiation of polymerization.

Here, the polybenzimidazole-based compound can be synthesized by means of block polymerization instead of random polymerization or alternating polymerization, and at this time, it is preferable to make polymerization occur in a manner where an oligomer, which is the first component, is synthesized under a condition where the mixture ratios of the monomer materials are shifted from the equivalent, and after that, a monomer material is added so that the mixture ratio is adjusted so as to match with the equivalent for the second component.

According to the present invention, though the molecular weight of the polybenzimidazole that has a sulfonic group and/or a phosphonic group is not particularly limited, 1,000 or more is preferable and 3,000 or more is more preferable. In addition, it is preferable for this molecular weight to be 1,000,000 or less and it is more preferable for this molecular weight to be 200,000 or less. In the case where this molecular weight is less than 1,000, it becomes difficult to obtain a plastic body with good properties from the polybenzimidazole-based compound due to a reduction in the viscosity. In addition, in the case where this molecular weight exceeds 1,000,000, the formation of a polybenzimidazole-based compound becomes difficult due to an increase in the viscosity. In addition, the molecular amount of the polybenzimidazole-based compound that has a sulfonic group and/or a phosphonic group according to the present invention can substantially be evaluated by using the inherent viscosity number in the case where measurement is carried out in a concentrated sulfuric acid. In addition, it is preferable for this inherent viscosity number to be 0.25 or greater and particularly it is more preferable for this inherent viscosity number to be 0.40 or greater. In addition, it is preferable for this inherent viscosity number to be 10 or less and particularly it is more preferable for this inherent viscosity number to be 8 or less. In the case where this inherent viscosity number is less than 0.25, it becomes difficult to obtain a plastic body with excellent properties from the polybenzimidazole-based compound due to a decrease in the viscosity. In addition, in the case where this inherent viscosity number exceeds 10, it becomes difficult to form a polybenzimidazole-based compound due to an increase in the viscosity.

A composition that has been known so far and where a polyarylene ether-based compound and a basic polymer such as polybenzimidazole are blended causes a precipitation due to an interaction between acidic groups and basic groups of the polymers at the time when the polymers are dissolved. Therefore, an amine compound or the like is added so as to convert the polymer with an acid group into a salt and, thereby, the two types of polymers are dissolved in the same solvent. As a result of this, a process for removing the amine salt by carrying out an acid treatment is required in order to provide proton conductivity after the formation of an ion conducting membrane. The polybenzimidazole that contains an acidic group according to the present invention has an acidic group within a basic polymer chain and, therefore, is characterized by not having the property where this forms a salt together with the added polymer that contains an acidic group so as to precipitate. As a result of this, the two types of polymers can be uniformly dissolved in the same solvent by themselves and when an ion conducting membrane is formed, it exhibits proton conducting properties by itself, which is advantageous.

A known method can be used in order to obtain a plastic body from the solution. A plastic body of polybenzimidazole that contains a sulfonic group and/or phosphonic group can be obtained by removing the solvent by means of, for example, heating, drying under reduced pressure, immersion into a solvent which does not dissolve the polymer and which can be mixed with a solvent that dissolves the polymer and the like. In the case where the solvent is an organic solvent, it is preferable to remove the solvent by means of heating or drying under reduced pressure. In the case where the solvent is a strong acid, it is preferable to immerse the solution into water, methanol, acetone or the like.

A preferable method for forming a membrane that includes a polyarylene-based compound and a polybenzimidazole compound that contains a sulfonic group according to the present invention is cast from the solution. As described above, the solvent can be removed from the solution and a membrane can be obtained by casting from the solution. Drying is preferable for removing the solvent from the point of view of uniformity of the membrane. In addition, it is preferable to dry the solution under a reduced pressure and at a temperature as low as possible in order to avoid decomposition or change in the quality of the polymer or the solvent. A glass plate, a polytetrafluoroethylene plate, or the like can be used as the substrate on which the polymer solution is cast. In the case where the viscosity of the solution is high, casting can be easily carried out at a high temperature when the substrate and the solution are heated so that the viscosity of the solution is lowered. Though the thickness of the solution at the time of casting is not particularly limited, a thickness from 10 μm to 1000 μm is preferable. In the case where it is too thin, the membrane cannot maintain its shape and in this case where it is too thick, the membrane tends to become uneven. It is more preferable for the thickness to be 100 μm to 500 μm. A known method can be used in order to control the thickness of the casting solution. For example, the thickness is made to be constant by using, for example, an applicator, a doctor blade, or the like and the thickness can be controlled by adjusting the amount and the concentration of the solution when the area of the cast is made constant by using a glass plate. The membrane that is cast from the solution can be made more uniform by adjusting the rate of removal of the solvent. For example, in the case of heating, the rate of evaporation can be lowered by lowering the temperature at the initial stage. In addition, in the case where the solution is immersed into a solvent, such as water, that does not dissolve the polymer, the rate of coagulation of the polymer can be adjusted by leaving the solution in the air or in an inert gas for an appropriate period of time. Though the membrane of the present invention can be adjusted to an arbitrary thickness in accordance with the application, it is preferable for the membrane to be as thin as possible from the point of view of the ion conductivity. Concretely speaking, it is preferable for the membrane to be 200 μm or less, it is more preferable for the membrane to be 50 μm or less, and it is most preferable for the membrane to be 20 μm or less.

(Manufacture of Plastic Body)

A plastic body such as a fiber or a film can be formed from the polyarylene ether-based compound that contains a sulfonic group and the composition thereof of the present invention according to an arbitrary method such as extrusion, spinning, rolling or casting. From among these, the formation from a solution where the polymer is dissolved in an appropriate solvent is preferable. Though a solvent that is suitable for this can be selected from among aprotic polar solvents such as N,N-dimethyl formamide, N,N-dimethyl acetamide, dimethyl sulfoxide, N-methyl-2-pyrrolidone and hexamethyl phosphone amide and alcohols such as methanol and ethanol, the solvent is not limited to these. More than one solvent from among these may be mixed for use as long as possible. It is preferable for the concentration of the compound in the solution to be in a range from 0.1 wt % to 50 wt %. In the case where the concentration of the compound in the solution is less than 0.1 wt %, it tends to become difficult to obtain an excellent plastic body and in the case where the concentration exceeds 50 wt %, the processability tends to become poor. The plastic body can be obtained from the solution according to a known method. The solvent can be removed so as to obtain a plastic body by means of, for example, heating, drying under a reduced pressure, immersion into a solvent that does not dissolve the compound and which can be mixed with a solvent that dissolves the compound or the like. In the case where the solvent is an organic solvent, it is preferable to remove the solvent by means of heating or drying under reduced pressure. At this time, the polymer can be formed into a variety of shapes such as a fiber form, a film form, a pellet form, a plate form, a rod form, a pipe form, a ball form, a block form, and the like, some of which are combined with another compound, if necessary. In the case where the polymer is combined with a compound of which the solubility is similar to that of the polymer, the plastic can be formed in an appropriate manner, which is preferable. The sulfonic group in the plastic body which has been obtained in such a manner may include those in salt form with a cation species and can be converted into a free sulfonic group by carrying out an acid treatment if necessary.

(Ion Conducting Membrane)

An ion conducting membrane can be manufactured from the polyarylene ether-based compound that contains a sulfonic group and the composition thereof of the present invention. Casting from the solution is most preferable as a technique for forming an ion conducting membrane and an ion conducting membrane can be obtained by casting from the solution from which the solvent is removed as described above. It is preferable to remove the solvent by means of drying from the point of view of the uniformity of the ion conducting membrane. In addition, the drying can be carried out under reduced pressure and at a temperature as low as possible in order to avoid decomposition and change in the quality of the compound or the solvent. In addition, in the case where the viscosity of the solution is high, the plastic can be easily cast at a high temperature when the substrate and the solution are heated so that the viscosity of the solution is lowered. Though the thickness of the solution at the time of casting is not particularly limited, it is preferable for the thickness to be 10 μm to 1000 μm. The thickness is more preferably 50 μm to 500 μm. In the case where the thickness of the solution is smaller than 10 μm, the ion conducting membrane tends not to maintain its shape and in the case where the thickness is greater than 1000 μm, the polymer electrolyte membrane tends to become uneven. The thickness of the casting solution can be controlled according to a known method. For example, the thickness is made to be constant by using, for example, an applicator, a doctor blade, or the like and the thickness can be controlled by adjusting the amount and the concentration of the solution when the area of the cast is made constant by using a glass plate. The membrane that is cast from the solution can be made more uniform by adjusting the rate of removal of the solvent. For example, in the case of heating, the rate of evaporation can be lowered by lowering the temperature at the initial stage. In addition, in the case where the solution is immersed into a solvent, such as water, that does not dissolve the polymer, the rate of coagulation of the polymer can be adjusted by leaving the solution in the air or in an inert gas for an appropriate period of time.

In addition, an ion conducting membrane according to the present invention can be obtained by forming a sulfonated polyarylene ether-based compound of the present invention or a precursor of a sulfonated polyarylene ether-based compound of the present invention which has at least a non-sulfonated dioxybiphenylene structure which can provide a sulfonated polyarylene ether-based compound of the present invention by means of a sulfonation reaction, or a composition that contains such a precursor, into film form, and after that, by making a sulfonation reaction progress while maintaining the film form. Any of the above-described variety of sulfonation agents can be used as the sulfonation agent at this time. In addition to this, it is possible to sulfonate the precursor using a sulfonation agent in gas form or in mist form, as described in, for example, Japanese Laid-Open Patent Publication No. 63-291920, and Japanese Published Patent Publication No. 2002-543224.

The thickness of the ion conducting membrane of the present invention can be adjusted to an arbitrary thickness in accordance with its application, and it is preferable for the membrane to be as thin as possible, from the point of view of ion conductivity. Concretely speaking, it is preferable for the thickness to be 5 µm to 200 µm, it is more preferable for the thickness to be 5 µm to 50 µm, and it is most preferable for the thickness to be 5 µm to 20 µm. In the case where the thickness of the ion conducting membrane is smaller than 5 µm, handling of the ion conducting membrane becomes difficult, and short-circuiting and the like tend to occur, in the case where a fuel cell is fabricated with this membrane, and in the case where the thickness is greater than 200 µm, the electrical resistance value of the ion conducting membrane becomes high, and the power generation performance of the fuel cell tends to lower. In the case where the membrane is utilized as an ion conducting membrane, the sulfonic groups in the membrane may include those which have become a metal salt, which can be converted into free sulfonic acid by means of an appropriate acid treatment. In this case, it is also effective to immerse the membrane that has been obtained through heating or without heating in an aqueous solution of sulfuric acid, hydrochloric acid or the like. In addition, it is preferable for the ion conductivity of the ion conducting membrane to be $1.0 \times 10^{-3}$ S/cm or higher. In the case where the ion conductivity is $1.0 \times 10^{-3}$ S/cm or higher, a fuel cell that uses this ion conducting membrane tends to obtain an appropriate output, and in the case where the ion conductivity is lower than $1.0 \times 10^{-3}$ S/cm, a decrease in the output of the fuel cell tends to occur.

The ion conducting membrane of the present invention is characterized by being useful for a direct methanol type fuel cell where methanol is used as the fuel. It is preferable for the ion conducting membrane to exhibit a value of 7 mmol/m²·sec for the permeation rate of methanol which is measured for a membrane that has been fabricated so as to have an average thickness of 50 µm at 25° C. using a 5M methanol solution. It is more preferable for the permeation rate of methanol to be 4 mmol/m²·sec or less, and it is still more preferable for the rate to be 1 mmol/m²·sec or less. This is because the membrane exhibits a particularly excellent power generating performance when exhibiting such a permeation rate of methanol. Here, in general, the methanol permeation rate tends to vary based on the thickness of the membrane. As a result of this, though the rate of transmission of methanol is evaluated by fabricating samples having an average thickness of 50 µm, the thickness of the membrane is not particularly limited when the membrane is actually utilized as an ion conducting membrane for a fuel cell. A membrane having an average thickness of 50 µm indicates a membrane of which the thickness is essentially in a range from an average thickness of 48 µm to an average thickness of 52 µm.

(Assembly)

In addition, the above-described ion conducting membrane or film of the present invention is installed on an electrode, and thereby, an assembly of an ion conducting membrane or film and an electrode can be obtained according to the present invention. Such an assembly can be fabricated according to a conventional, known method, and, for example, there is a method for making an ion conducting membrane and an electrode adhere to each other by applying an adhesive to the surface of the electrode, a method for pressing an ion conducting membrane against each other under application of heat and the like. From among these, a method for applying an adhesive of which the main component is a sulfonic group containing polyarylene ether-based compound of the present invention and its resin composition to the surface of an electrode for adhesion is preferable. This is because according to this method, adhesion between an ion conducting membrane and an electrode is high, and loss in the ion conductivity of the ion conducting membrane is low.

(Fuel Cell)

A fuel cell can be fabricated using an assembly of an ion conducting membrane or film and an electrode, as described above. The ion conducting membrane or film of the present invention is excellent in heat resistance, processability and ion conductance, and therefore, a fuel cell that can withstand operation at high temperature, which can be easily manufactured, and which has an excellent output can be provided.

EXAMPLES

In the following, though the present invention is concretely described using the embodiments, the present invention is not limited to these embodiments. Here, a variety of measurements were carried out as follows.

Viscosity of Solution: Polymer powder was dissolved in N-methyl pyrrolidone so as to have a concentration of 0.5 g/dl, and the viscosity thereof is measured using an Ubbelhode viscometer in a thermostatic bath at 30° C., where the viscosity was evaluated in inherent viscosity (ln[ta/tb]/c) (where ta is the number of seconds for a sample solution to drop, tb is the number of seconds for only the solvent to drop, and c is the polymer concentration).

TGA: An apparatus for thermogravimetry (TGA-50) made by Shimadzu Corporation was used, and measurement was carried out in an argon atmosphere at a heating rate of 10° C./min (during the heating, the temperature is maintained at 150° C. for 30 minutes, in order to sufficiently remove moisture).

Ion Conductivity Measurement: A platinum wire (diameter: 0.2 mm) was placed on the surface of a membrane sample in strip form on a self-made probe for measurement (made from tetrafluoroethylene), and the sample was held in a thermostat and humidistat oven (Nagano Science Co., Ltd. LH-20-01) at 80° C., 95% RH, so that the impedance between the platinum wires could be measured by a 1250 F frequency response analyzer made by Solartron Corporation. Measurement was carried out while changing the distance between the electrodes, and the conductivity was calculated by canceling the contact resistance between the membrane and the platinum wire from the inclination of the plot for the resistance measurement values, which were estimated from the C-C plots, against the distance between the electrodes, using the following equation:

conductivity [S/cm]=1/width of membrane [cm]×thickness of membrane [cm]×resistance inclination between electrodes [Ω/cm].

Method for Measuring Amount of Dioxybiphenylene Group in Structure of Polymer Skeleton: In the case where the ratios of the mixed monomers are clear at the time of polymerization, the amount of dioxybiphenylene group in the structure of the skeleton can be calculated from these ratios, while the contents of dioxybiphenylene can be found by means of an H-NMR measurement. At this time, it is useful to refer to the amount of sulfonic group that has been found from the ion exchange capacity (IEC) and the structure information obtained from infrared spectrum.

H-NMR Measurement: A Gemini-20NMR spectroscope made by Varian Corporation was utilized, and measurement was carried out in a DMSO-d6 solution at 80° C.

Methanol Permeation Rate: The permeation rate of a liquid fuel through the ion exchanging membrane was measured as the permeation rate of methanol according to the following method. An ion exchanging membrane having an average thickness of 50 μm (a membrane of which the average thickness was in a range from 48 μm to 52 μm was assumed to be a membrane having an average thickness of 50 μm) which had been immersed for 24 hours in a methanol solution of 5M (mol/liter) which had been adjusted to a temperature of 25° C. was inserted into an H-type cell where 100 ml of 5M methanol solution was injected into one side of the cell and 100 ml of ultra-pure water (18 MΩ·cm) was injected into the other cell, and the amount of methanol that was diffused into the ultra-pure water through the ion exchanging membrane was measured using a gas chromatograph while stirring the cells on both sides at 25° C., and thereby, the permeation rate of methanol was calculated (the area of the ion exchanging membrane is 2.0 $cm^2$).

Ion Exchanging Capacity (IEC): the weight of the sample that had been dried overnight in a nitrogen atmosphere was measured, and the sample was mixed through stirring with sodium hydroxide solution, and after that, the capacity was found by means of back titration using a hydrochloric acid aqueous solution.

Fuel Cell Performance Evaluation of Power Generation: a small amount of ultra-pure water and isopropyl alcohol were added to carbon that carries a Pt/Ru catalyst (TEC61E54 by Tanaka Precious Metals Co., Ltd.) so that the carbon was moistened, and after that, a 20% Nafion solution (product number: SE-20192) made by DuPont Corporation was added so that the weight ratio of the carbon that carries a Pt/Ru catalyst to the Nafion becomes 2.5:1. Next, the solution was stirred so as to prepare a catalyst paste for the anode. This catalyst paste was applied to carbon paper TGPH-060 made by Toray Corporation which became the gas diffusion layer so that the amount of attached platinum becomes 2 $mg/cm^2$, and was dried, and thus, carbon paper with an electrode catalyst layer for the anode attached was prepared. In addition, a small amount of ultra-pure water and isopropyl alcohol was added to carbon that carries a Pt catalyst (TEC10V40E by Tanaka Precious Metals Co., Ltd.) so that the carbon was moistened, and after that, a 20% Nafion solution (product number: SE-20192) made by DuPont Corporation was added so that the weight ratio of the carbon that carries a Pt catalyst to the Nafion becomes 2.5:1, and the solution was stirred so as to prepare a catalyst paste for the cathode. This catalyst paste was applied to carbon paper TGPH-060 made by Toray Corporation on which water repellent processing had been carried out, so that the amount of attached platinum became 1 $mg/cm^2$, and was dried, and thus, carbon paper with an electrode catalyst layer for the cathode attached was prepared. A membrane sample was sandwiched between the above-described two types of carbon paper with an electrode catalyst layer attached, so that the electrode catalyst layers made contact with the membrane sample, and pressure and heat were applied to the resulting assembly for three minutes at 130° C. under 8 MPa, and thus, a membrane-electrode assembly was obtained. This assembly was placed in a fuel cell FC25-02SP for evaluation made by Electrochem Corporation, and a power generation test was carried out using a fuel cell power generation testing apparatus (made by Toyo Technica Corporation). The power was generated while a methanol solution (1.5 ml/min) of 2 mol/l and a highly pure oxygen gas (80 ml/min), which were respectively adjusted to a temperature of 40° C., were supplied to the anode and the cathode at a temperature of the cell of 40° C.

Example 1

5.2335 g (0.01065 mole) of a 3,3'-disulfo-4,4'-dichlorodiphenyl sulfone disodium salt (abbreviation: S-DCDPS), 2.3323 g (0.013559 mole) of 2,6-dichlorobenzonitrile (abbreviation: DCBN), 4.5086 g (0.02421 mole) of 4,4'-biphenol, 3.8484 g (0.02784 mole) of potassium carbonate, and 2.61 g of molecular sieve were measured and placed in a 100 ml flask having four openings into which nitrogen was made to flow. 35 ml of NMP was put into the flask, and the whole was stirred for one hour at 150° C., and after that, the chemical reaction was made to continue by setting the reaction temperature at 195° C. to 200° C. until the viscosity of the system had increased sufficiently (approximately five hours). After being left to be cooled, the settled molecular sieve was removed and the polymer formed was made to precipitate in water in strand form. The obtained polymer was washed for one hour in boiling water, and after that, was dried. The inherent viscosity of the polymer was 1.24.

1 g of the polymer was dissolved in 5 ml of NMP and cast so as to have a thickness of approximately 200 μm on a glass plate of a hot plate, so that the NMP was removed until the polymer in film form was obtained, and after that, the film was immersed overnight in water. The obtained film was put into a diluted sulfuric acid (6 ml of concentrated sulfuric acid and 300 ml of water), and this was boiled for one hour so that the salt was removed, and after that, the film was boiled in pure water for another hour so that the acid component was removed. The IR spectrum of the obtained film is shown in FIG. 1. When the ion conductivity of this film was measured, the value was 0.17 S/cm. The temperature at which the weight of this film is reduced by 3% as a result of thermogravimetry (measured with a reference of the weight of a sample at 200° C.) was 389° C.

Example 2

Polymerization was carried out in a manner which is the same as in Example 1, except that 3.9251 g (0.00799 mole) of 3,3'-disulfo-4,4'-sodium dichlorodiphenyl sulfone disodium salt (abbreviation: S-DCDPS) and 2.7904 g (0.01622 mole) of 2,6-dichlorobenzonitrile (abbreviation: DCBN) were used, and thus, a polymer was obtained. The inherent viscosity of the polymer was 1.58.

The polymer in an NMP solution of which the concentration had been adjusted was cast on a glass plate of a hot plate while the thickness thereof was adjusted, and the NMP was removed until the polymer became of a film form, and after that, the polymer was immersed overnight in water so that a film having an average thickness of 50 μm was prepared. The obtained film was treated in diluted sulfuric acid (6 ml of concentrated sulfuric acid and 300 ml of water) for one hour so as to remove the salt, and after that, the film was immersed in water for another hour so that the acid components were removed. When the ion conductivity of this film was measured, the value was 0.11 S/cm. The temperature at which the weight of this film is reduced by 3% as a result of thermogravimetry (measured with a reference of the weight of a sample at 200° C.) was 389° C. The permeation rate of methanol was 3.92 $mmol/m^2$·sec. The form of the membrane was appropriately maintained, even when the obtained film was immersed in boiling water for five hours.

Example 3

Figure 2:
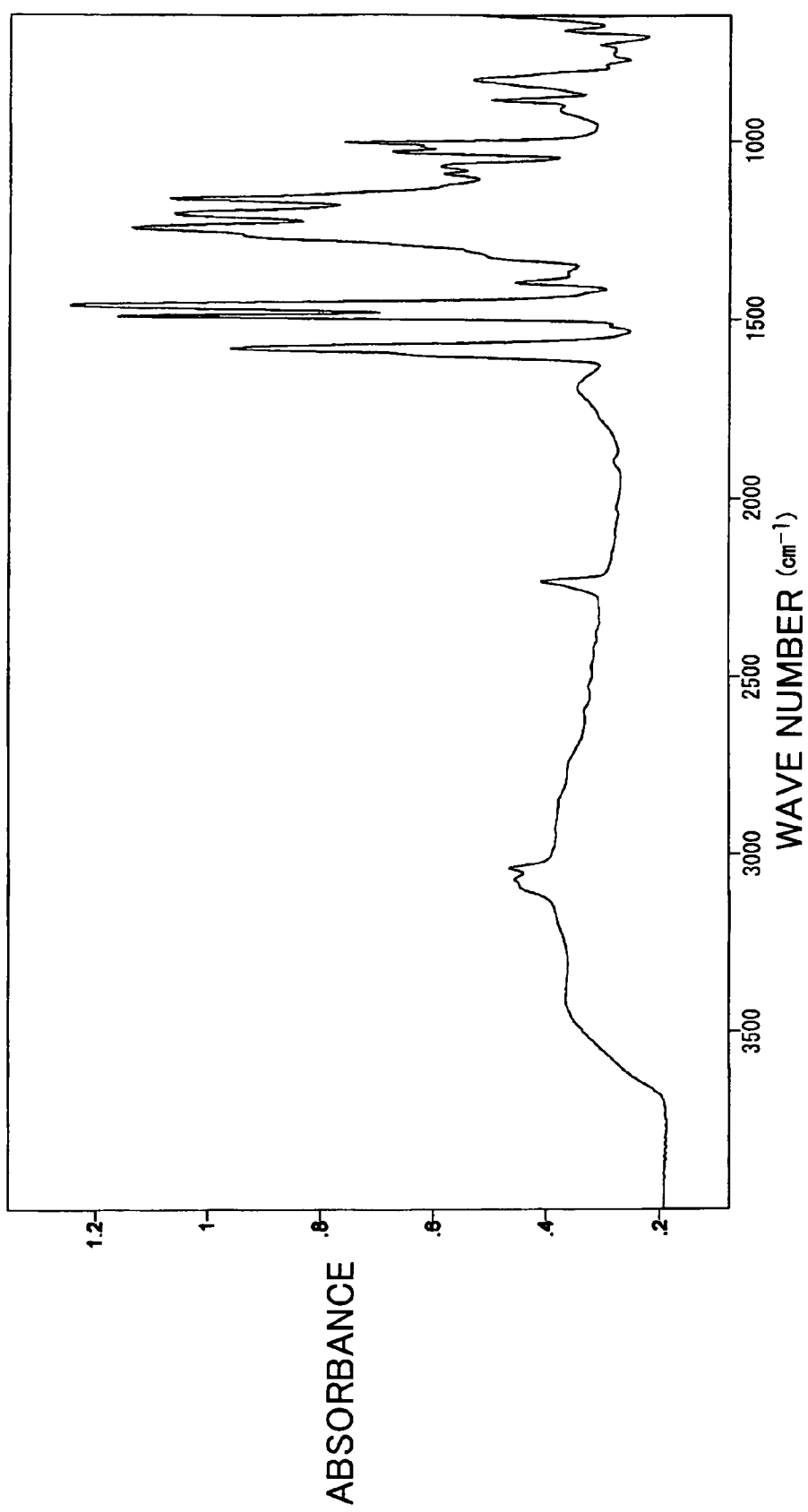
FIG. 2 is a chart showing the IR spectrum of a sulfonated polyarylene ether that has been obtained when S-DCDPS:DCBN=38:62.
Figure 3:
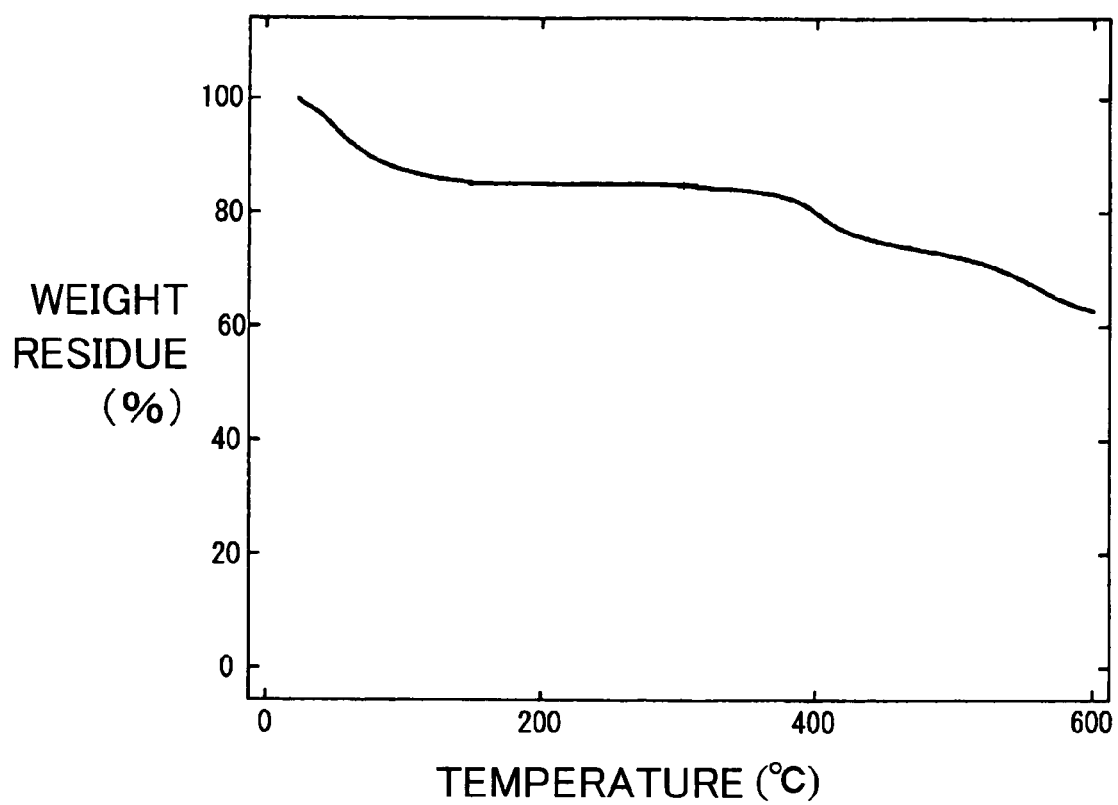
FIG. 3 is a TGA chart of a sulfonated polyarylene ether that has been obtained when S-DCDPS:DCBN=38:62.

A polymer was synthesized by changing the ratio of S-DCDPS to DCBN in Example 2, and the same evaluation was carried out. The results are shown in Table 1. In addition, the IR spectrum and the TGA chart of the polymer film that was obtained when S-DCDPS:DCBN=38:62 (mole ratio) are shown in FIGS. 2 and 3.

TABLE 1

| Monomer ratio (mol ratio) | | Reaction time (hr) | Inherent viscosity (dl/g) | Conductivity (S/cm) | Temperature at which weight is reduced by 3% (° C.) | Permeation rate of methanol (mmol/m² · sec) |
|---|---|---|---|---|---|---|
| S-DCDPS | DCBN | | | | | |
| 22 | 78 | 3 | 1.37 | 0.03 | 379 | 2.27 |
| 23 | 77 | 6 | 1.00 | 0.04 | 367 | 2.60 |
| 28 | 72 | 6 | 1.09 | 0.07 | 385 | 3.87 |
| 38 | 62 | 5 | 0.77 | 0.14 | 380 | 5.68 |
| 50 | 50 | 9 | 1.15 | 0.22 | 369 | 8.45 |
| 60 | 40 | 6 | 0.99 | 0.27 | 382 | 10.5 |
| 70 | 30 | 11 | 1.10 | 0.36 | 351 | 12.0 |
| 80 | 20 | 9 | 0.84 | 0.45 | 324 | 14.5 |

Example 4

The ratio of S-DCDPS to DCBN in Example 3 was changed to S-DCDPS:DCBN=48:52 (mol ratio), and the same evaluation was carried out. The amount of dioxybiphenylene group in the structure of this polymer skeleton is 54.3 wt %. The inherent viscosity of the polymer was 0.92. The EC that had been found by means of titration of the fabricated film was 2.19 meq/g, the ion conductivity was 0.28 S/cm, and the temperature at which the weight is reduced by 3% was 381° C. This film was placed in a saturated vapor atmosphere at 130° C. for four hours, and the form of the film was appropriately maintained.

Comparative Example 1

When a polymer was synthesized without using DCBN in Example 1, the obtained polymer became water soluble, and evaluation of its suitability as an ion conducting membrane could not be carried out.

Comparative Example 2

When a polymer was synthesized without using S-DCDPS in Example 1, a polymer having an inherent viscosity of 2.76 was obtained after 2.5 hours of reaction time. The ion conductivity of the film was below the lower limit of measurement.

Comparative Example 3

When polymerization was carried out using 3.8934 g (0.013559 mole) of 4,4'-dichlorodiphenyl sulfone instead of DCDN in Example 1, it took 16 hours to obtain a polymer having an inherent viscosity of 0.70.

Comparative Example 4

11.872 g (0.02417 mole) of S-DCDPS, 8.482 g (0.02954 mole) of 4,4'-dichlorodiphenyl sulfone (abbreviation: DCDPS), 10.000 g (0.05370 mole) of 4,4'-biphenol, 8.536 g (0.06176 mole) of potassium carbonate, and 100 ml of NMP were used in Example 3, and the same evaluation was carried out. The amount of dioxybiphenylene group having the structure of the skeleton of the present polymer was 46.0 wt %. The inherent viscosity of the polymer that was polymerized for 11 hours was 0.71. The IEC that was found by means of titration of the fabricated film was 1.69 meq/g, the ion conductivity was 0.19 S/cm, and the temperature at which the weight is reduced by 3% was 372° C. The present film was left for four hours in a saturated vapor atmosphere at 130° C., and the film was fused, and it was observed that the form collapsed.

Example 5

10.025 g (0.02041 mole) of S-DCDPS, 1.851 g (0.00644 mole) of DCDPS, and 4.619 g (0.02685 mole) of DCBN were used in Comparative Example 4, and the same evaluation was carried out. The amount of dioxybiphenylene group having the structure of the skeleton of the present polymer was 53.7 wt %. The inherent viscosity of the polymer that was polymerized for seven hours was 0.62. The IEC which was found by means of titration of the fabricated film was 1.73 meq/g, the ion conductivity was 0.16 S/cm, and the temperature at which the weight is reduced by 3% was 372° C. When the present film was left for four hours in a saturated vapor atmosphere at 130° C., it could not be observed that the film was fused.

Example 6

14.029 g (0.08156 mole) of DCBN, 15.1873 g (0.08156 mole) of 4,4'-biphenol, and 12.963 g (0.09379 mole) of potassium carbonate were measured and put into a 300 ml flask having four openings, into which nitrogen was made to flow. 110 ml of NMP was put into the flask, and was stirred for one hour at 150° C., and after that, the reaction was made to continue by increasing the reaction temperature to between 195° C. and 200° C. until the viscosity of the system had sufficiently increased (approximately two hours). After being left to be cooled, the obtained polymer was made to precipitate in strand form in water. The obtained polymer was washed for one hour in boiling water, and after that, was dried. The inherent viscosity of the polymer was 1.65. The amount of dioxybiphenylene group of the present polymer was 64.6 wt %. 1 g of the polymer was heated to 65° C. together with 20 ml of concentrated sulfuric acid, and this was stirred for seven hours. The polymer was collected by pouring the polymer solution into water, and washing with water was repeated until the water became neutral, and after that, the polymer was dried. The collected amount of obtained sulfonated polymer was 1.1 g. The IEC which was formed by means of titration was 1.61 meq/g. The present sample was left for four hours in a saturated vapor atmosphere at 130° C., and it could not clearly be observed that the form changed.

Example 7

Figure 4:
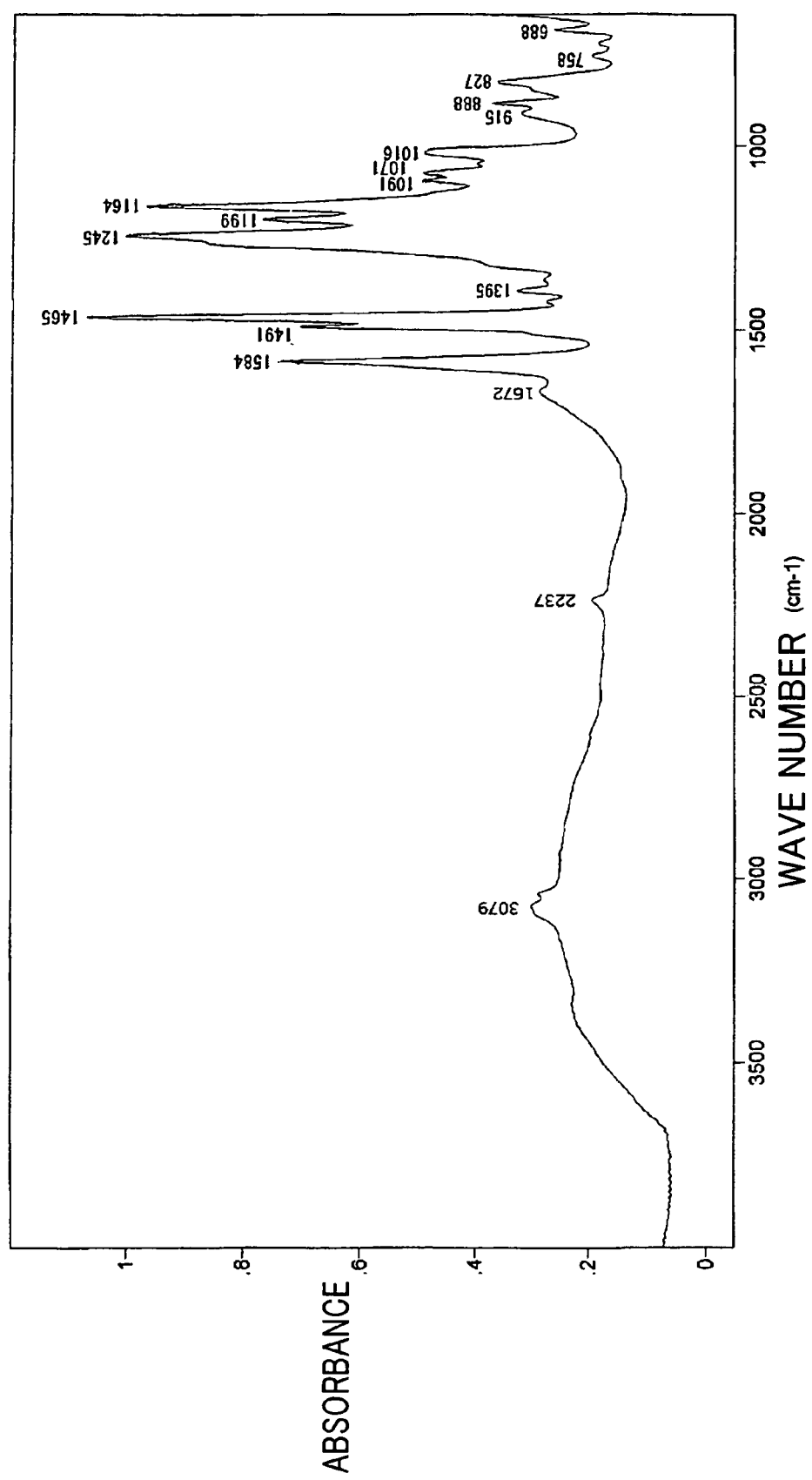
FIG. 4 is a chart showing the IR spectrum of a sulfonated aromatic polyether-based film that has been obtained in Example 7.

14.332 g (0.02917 mole) of S-DCDPS, 6.387 g (0.03713 mole) of DCBN, 12.3468 g (0.06631 mole) of 4,4'-biphenol, and 10.5387 g (0.07625 mole) of potassium carbonate were measured and put into a 300 ml flask having four openings, into which nitrogen was made to flow. 110 ml of NMP was put into the flask and stirred for one hour at 150° C., and after that, the reaction was made to continue by increasing the reaction temperature to between 195° C. and 200° C. until the viscosity of the system had sufficiently increased (approximately 6 hours). After being left to be cooled, the obtained polymer was made to precipitate in strand form in water. The obtained polymer was washed for one hour in boiling water, and after that, was dried. The inherent viscosity of the polymer was 1.06. 1 g of the polymer was dissolved in 5 ml of NMP and cast on a glass plate of a hot plate so as to have a thickness of approximately 200 μm, and the NMP was removed until the polymer became of a film form, and after that, the polymer was immersed overnight in water. The obtained film was immersed in concentrated sulfuric acid for 90 minutes at room temperature. The acid components were removed by boiling the film in pure water for one hour, and after being dried, the IEC was found, by means of titration of the present film, to be 2.3 meq/g, and the ion conductivity was measured at a value of 0.36 S/cm. The temperature at which the weight is reduced by 3% as a result of thermogravimetry (measured with a difference of the weight of a sample at 200° C.) was 331° C. in the present film. The IR spectrum of the present film is shown in FIG. 4.

Example 8

9.237 g (0.05370 mole) of DCBN, 10.000 g (0.05370 mole) of 4,4'-biphenol, 8.536 g (0.06176 mole) of potassium carbonate, and 100 ml of NMP were used in the polymerization of Example 7, and the same reaction was made to occur. The inherent viscosity of the polymer that was polymerized for three hours was 2.76. 1 g of the polymer was immersed in concentrated sulfuric acid for 63 hours at room temperature. The acid components were removed by boiling the polymer for one hour in pure water, and after the polymer was dried, the IEC was found, by means of titration, to be 1.90 meq/g.

Example 9

The polymer that was obtained in Example 8 was used to fabricate a film which is the same as that of Example 7. The obtained film was immersed in concentrated sulfuric acid for 90 hours at room temperature. The acid components were removed by boiling the film for one hour in pure water, and after the film was dried, the IEC was found, by means of titration, to be 1.17 meq/g, and the ion conductivity was measured at 0.011 S/cm.

Comparative Example 5

The ion conductivity of the film that was obtained in Example 9 was below the lower measurement limit before the film was immersed in the concentrated sulfuric acid.

Example 10

1.500 g (5.389×10−3 mole) of 3,3',4,4'-tetraamino diphenyl sulfone (abbreviation: TAS), 1.445 g (5.389×10−3 mole) of 2,5-dicarboxy benzene sulfonic acid monosodium salt (abbreviation: STA, purity: 99%), 20.48 g of polyphosphoric acid (phosphorous pentoxide content: 75%), and 16.41 g of phosphorous pentoxide were measured and placed in a vessel for polymerization. Nitrogen was made to flow through the vessel, and the temperature was increased to 100° C. while the contents were stirred on an oil bath. After being held for one hour at 100° C., the temperature was increased to 150° C., and the whole was held for one hour at this temperature, and then, the temperature was increased to 200° C., and the whole was held for four hours for polymerization. After polymerization was completed, the whole was left to be cooled, water was added, the polymer was taken out, and washing with water was repeated using a blender for home use until a pH test paper indicated a neutral pH. The obtained polymer was dried overnight under reduced pressure at 80° C. The inherent viscosity of the polymer was 1.71. The present polybenzimidazole polymer that contains an acid group is referred to as TTS100.

5.9472 g (0.01211 mole) of S-DCDPS, 2.0824 g (0.01211 mole) of DCBN, 4.5086 g (0.02421 mole) of 4,4'-biphenol, and 3.8484 g (0.02784 mole) of potassium carbonate were measured and put into a 100 ml flask having four openings into which nitrogen was made to flow. 35 ml of NMP was put into the flask and stirred for one hour at 150° C., and after that, the reaction was made to continue by increasing the reaction temperature to between 195° C. and 200° C. until the viscosity of the system had sufficiently increased (approximately five hours). After being left to be cooled, the polymer was made to precipitate in strand form in water. The obtained polymer was washed with repeating water immersion, and after that, was dried. The inherent viscosity of the polymer was 1.24. This polymer is referred to as a polymer where S-DCDPS:DCBN=1:1.

3 g of TTS 100 was dissolved in 15 ml of NMP on an oil bath which was heated to 170° C. while 3 g of a polymer where S-DCDPS:DCBN=1:1 was dissolved in 9 ml of NMP at room temperature, and then, the two solutions were mixed at room temperature so as to obtain a uniform solution. This solution was spread on a glass plate of a hot plate so as to have a thickness of approximately 500 μm, and the NMP was vaporized. The film was peeled from the glass plate and immersed overnight in water, and after that, was treated in a 1M sulfuric acid solution for one hour at 70° C. After that, washing with water was repeated, and thus, a film for measuring ion conductivity was fabricated. The ion conductivity at 95% RH at 80° C. was 0.004 S/cm. The permeation rate of methanol was 1.15 mmol/m$^2$·sec. When the present film was cut into a 1 cm square and immersed in hot water of 100° C. for one hour, no change could be observed in the form of the film. The temperature at which the weight is reduced by 3% as a result of thermogravimetry of the film (measured with a reference of the weight of a sample at 200° C.) was 372° C., the IEC was found, by means of titration, to be 2.18.

Example 11

In the same manner as in Example 10, a polymer where S-DCDPS:DCBN=38:62 was synthesized (the inherent viscosity of the obtained polymer was 1.31), and evaluation was carried out in the same manner as in Example 10, except that 1 g of TTS 100 was dissolved in 10 g of NMP, and 4 g of the polymer where S-DCDPS:DCBN=38:62 was dissolved in 10 g of NMP when the film was fabricated. The ion conductivity at 95% RH at 80° C. was 0.034 S/cm. The permeation rate of methanol was 2.62 mmol/m$^2$·sec. When the present film was cut into a 1 cm square and immersed in hot water of 100° C. for one hour, no change could be observed in the form of the film. The temperature at which the weight is reduced by 3% as a result of thermogravimetry of the film (measured with a reference of the weight of a sample at 200° C.) was 357° C., the IEC was found, by means of titration, to be 1.81.

Example 12

In the same manner as in Example 10, a polymer where S-DCDPS:DCBN=70:30 was synthesized (the inherent viscosity of the obtained polymer was 1.02), and evaluation was carried out in the same manner as in Example 10, except that 1 g of TTS 100 was dissolved in 10 g of NMP, and 4 g of the polymer where S-DCDPS:DCBN=70:30 was dissolved in 10 g of NMP when the film was fabricated. The ion conductivity at 95% RH at 80° C. was 0.16 S/cm. When the present film was cut into a 1 cm square and immersed in hot water of 100° C. for one hour, no change could be observed in the form of the film. The temperature at which the weight is reduced by 3% as a result of thermogravimetry of the film (measured with a reference of the weight of a sample at 200° C.) was 376° C., the IEC was found, by means of titration, to be 2.60.

Comparative Example 6

A film was fabricated solely from the polymer where S-DCDPS:DCBN=70:30 that was synthesized in Example 12, and the ion conductivity at 95% RH at 80° C. was measured at 0.38 S/cm. When the present film was cut into a 1 cm square and immersed in hot water of 100° C. for one hour, the film swelled a great deal and the form collapsed.

Comparative Example 7

In Example 12, polybenzimidazole was synthesized solely from TASz, without using STA. The inherent viscosity of the obtained polymer was 2.33. This polymer was used to fabricate a composite film, together with a polymer where S-DCDPS:DCBN=70:30, of which the composition was the same as that of Example 10, and the film was evaluated. In this case, when the two NMP solutions were mixed, a phenomenon was observed where an acid base polymer complex precipitated, and therefore, it was necessary to convert the polymer where S-DCDPS:DCBN=70:30 to a triethyl amine salt before preparing a uniform solution, and to fabricate a film of the target blend by disengaging an amine salt after the formation of the film. In addition, the ion conductivity at 95% RH at 80° C. was measured as 0.009 S/cm, which is a low value.

Example 13

8.98 g (0.01773 mol) of 4,4'-bis(4-phenoxyphenyl) diphenyl ether, and 3.60 g (0.01773 mol) of isophthaloyl chloride were dissolved in 200 ml of dichloroethane, and this was cooled in an ice bath, and after that, 6.15 g (0.0461 mol) of aluminum chloride was added. After the whole was stirred for one hour, the ice bath was removed, and polymerization was continued for the following 17 hours at room temperature. The product of the reaction was poured into methanol so that the polymer was taken out, and the polymer was washed in a diluted hydrochloric acid and subsequently repetitively washed in hot water, after which the polymer was dried. The inherent viscosity of the obtained polymer was measured in concentrated sulfuric acid as 1.01. The amount of dioxybiphenylene group having the structure of the skeleton of the present polymer was 57.9 wt %.

1 g of the polymer was dissolved in 20 ml of concentrated sulfuric acid, and this was stirred for five hours at room temperature. The polymer was collected by pouring the polymer solution in water, and washing with water was repeated until the water became neutral, and after that, the polymer was dried. The amount of collection of obtained sulfonated polymer was 1.0 g. 500 mg of the sulfonated polymer was dissolved and stirred in 2.5 ml of NMP at room temperature, and cast on a glass plate that had been heated on a hot plate so as to have a thickness of 200 μm. After the solvent was removed, the polymer was immersed in water, and thus, a film was obtained. After the film was immersed in diluted sulfuric acid for one hour at 100° C., the film was immersed for an additional hour in pure water at 100° C. The ion exchanging capacity was 2.02 meq/g. The ion conductivity, which was measured at 98% RH at 80° C., was 0.19 S/cm. The inherent viscosity that was measured in an NMP solution was 1.67. The temperature at which the weight is reduced by 3% with a difference of the weight at 200° C. by means of TGA measurement was 346° C. Methanol permeation rate was 6.81 mmol/m$^2$·sec. When the present film was cut into a 1 cm square and immersed in hot water of 100° C. for one hour, no change was observed in the form of the film.

Example 14

6.2992 g (0.01065 mole) of 3,3'-disulfo-4,4'-dichloro diphenyl ketone 2 disodium salt was used instead of S-DCDPS in Example 1, and polymerization was made to occur for 20 hours. The inherent viscosity of the obtained polymer was 0.67. The ion conductivity of a film which was fabricated in the same manner as in Example 1 was measured at a value of 0.14 S/cm. The temperature at which the weight is reduced by 3% as a result of thermogravimetry (measured with a reference of the weight of a sample at 200° C.) was 358° C. in the present film.

Example 15

A polymer where S-DCDPS:DCBN=55:45 was synthesized in the same manner as in Example 3. A film was fabricated in the same manner as in Example 3, and the obtained film was immersed in concentrated sulfuric acid for three hours at room temperature. The film that was obtained by subsequent washing with water maintained its original form. The ion exchanging capacity was 3.15 meq/g. When the ion conductivity of the present film was measured, the value was 0.56 S/cm at 95% RH at 80° C., and the value was 0.02 S/cm at a humidity of 50% RH. The temperature at which the weight is reduced by 3% by means of thermogravimetry (measured with a reference of the weight of a sample at 200° C.) was 361° C. in the present film. Methanol permeation rate was 9.97 mmol/m$^2$·sec. Even when the obtained film was immersed for five hours in boiling water, the form of the membrane was appropriately maintained.

Example 16

A polymer where S-DCDPS:DCBN=80:20 was synthesized in the same manner as in Example 15. The obtained polymer was immersed in concentrated sulfuric acid for one hour at room temperature. The ion exchanging capacity of the polymer that was obtained by subsequent washing with water was 3.37 meq/g. The obtained polymer was utilized instead of the polymer where S-DCDPS:DCBN=38:62 in Example 11 so that TTS 100 and a blended film were fabricated. The ion conductivity of the obtained film at 95% RH at 80° C. was 0.21 S/cm. The permeation rate of methanol was 11.5 mmol/m$^2$·sec. When the present film was cut into a 1 cm square and immersed in hot water of 100° C. for one hour, no change was observed in the form of the film. The temperature at which the weight is reduced by 3% by means of thermogravimetry (measured with a reference of the weight of a sample at 200° C.) was 371° C. in the present film.

Example 17

The same evaluation was carried out using the polymer that was obtained in Example 13 instead of the polymer where S-DCDPS:DCBN=38:62 in Example 11. The ion conductivity at 95% RH at 80° C. was 0.051 S/cm. The permeation rate of methanol was 3.03 mmol/m²·sec. Even when the present film was cut into a 1 cm square and immersed in hot water of 100° C. for one hour, no change was observed in the form of the film. The temperature at which the weight is reduced by 3% by means of thermogravimetry (measured with a reference of the weight of a sample at 200° C.) was 366° C. in the present film. The IEC was found, by means of titration, to be 1.39.

Example 18

Polymerization was carried out in a manner that is the same as that of Example 2, except that 5.5199 g of bisphenol A was used instead of 4,4'-biphenol, and thus, a polymer was obtained. The inherent viscosity of the polymer was 1.31. When the ion conductivity of the fabricated film was measured, the value was 0.14 S/cm. The temperature at which the weight is reduced by 3% by means of thermogravimetry was 362° C. in the present film. The permeation rate of methanol was 6.61 mmol/m²·sec. Even when the film was immersed for five hours in boiling water, the form of the membrane was appropriately maintained.

Example 19

A polymer was synthesized using 2,4-difluorobenzonitrile instead of and in the equimolar amount of 2,6-dichlorobenzonitrile in Example 2. The inherent viscosity of the polymer was 0.61. When the ion conductivity of the fabricated film was measured, the value was 0.11 S/cm. The temperature at which the weight is reduced by 3% by means of thermogravimetry was 371° C. in the present film. The permeation rate of methanol was 4.24 mmol/m²·sec. Even when the film was immersed for five hours in boiling water, the form of the membrane was appropriately maintained.

Example 20

Figure 5:
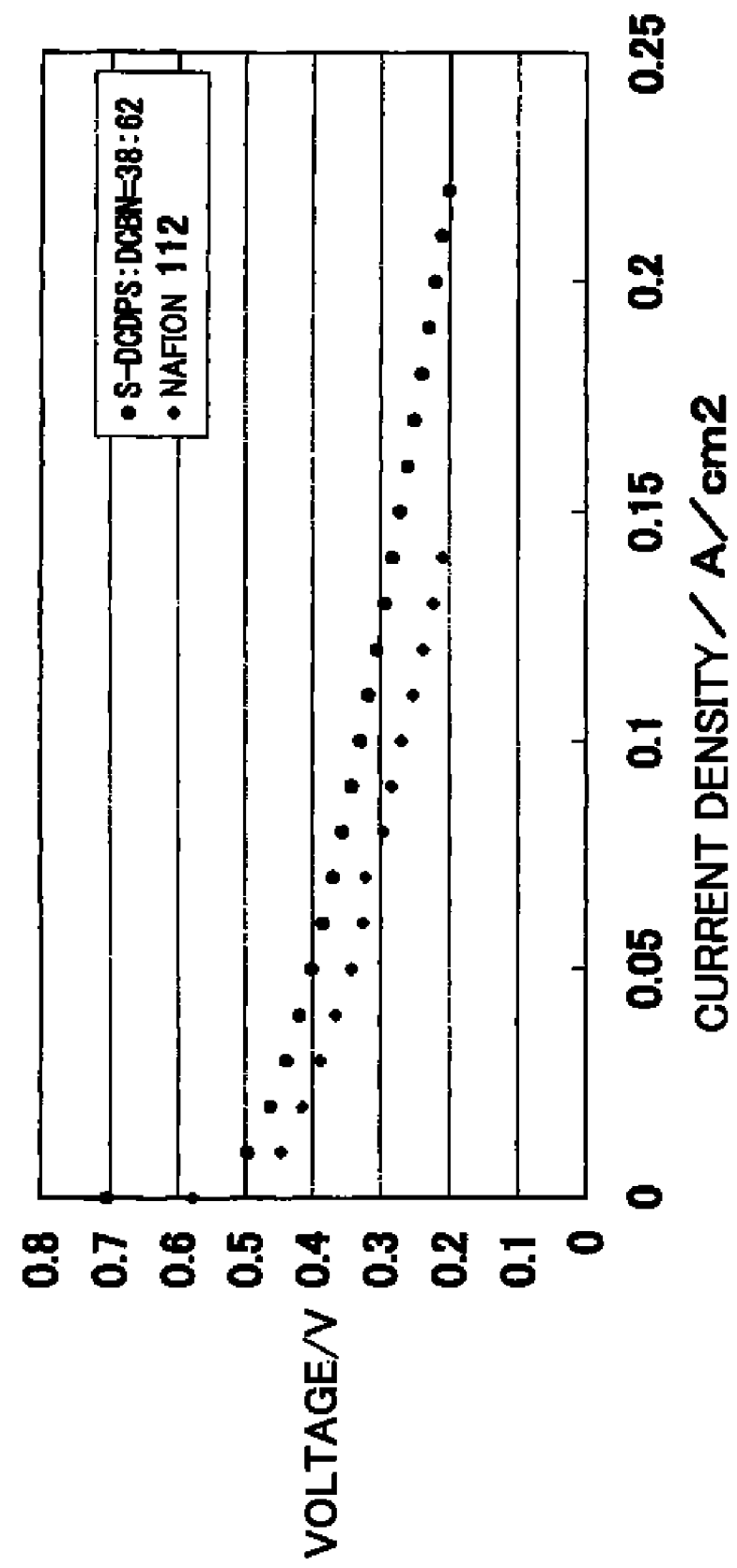
FIG. 5 is a graph showing the power generation properties of a sulfonated polyarylene ether that has been obtained when S-DCDPS:DCBN=38:62 and Nafion 112 (registered trademark).

A film which was fabricated from the polymer that was obtained when S-DCDPS:DCBN=38:62 (mol ratio) in Example 3 was used to carry out a power generation evaluation. The obtained results are shown in FIG. 5. Excellent power generating properties were exhibited, in comparison with the film where a Nafion 112 (registered trademark) film made by DuPont Corporation was used and which was evaluated in the same manner.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A polyarylene ether-based compound comprising polymer components represented in general formula (1) and general formula (2):

$$\left(\!\!\begin{array}{c}X^1O_3S \\ \phantom{X} \\ \phantom{X}\end{array}\!\!-\!\!\!\bigcirc\!\!\!-Y-\!\!\!\bigcirc\!\!\!-O-Ar-O\right) \quad (1)$$
(with $SO_3X^1$ substituent)

$$\left(-\!\!\!\bigcirc\!\!\!-O-Ar'-O-\right) \quad (2)$$
(with CN substituent)

wherein Ar indicates a divalent aromatic group, Y indicates a sulfone group or a ketone group, X indicates H or a monovalent cation species, and Ar' indicates a divalent aromatic group.

2. The polyarylene ether-based compound according to claim 1, wherein at least one of said Ar and Ar' includes a -Ph-Ph- group.

3. The polyarylene ether-based compound according to claim 1, wherein the —O—Ar—O— unit, the —O—Ar'—O— unit or the sum of these units shares 52 wt % or higher in the polymer structure which is a skeleton structure from which the bonded sulfonic group has been removed.

4. The polyarylene ether-based compound according to claim 2, comprising polymer components represented in general formula (3) and general formula (4):

$$(3)$$
(structure with $X^2O_3S$, sulfone, and $SO_3X^2$ substituents)

$$(4)$$
(structure with CN substituent)

wherein $X^2$ indicates H or a monovalent cation species.

5. The polyarylene ether-based compound according to claim 1, further comprising polymer components represented in general formula (5) and general formula (6):

$$(5)$$
(structure with $(SO_3H)n_1$ and $X^3$ substituents)

$$(6)$$
(structure with $(SO_3H)n_2$, $(SO_3H)n_3$, $Z^1r^1$, $Z^2r^2$ substituents)

wherein $n_1$, $n_2$ and $n_3$ indicate the numbers of bonds of the sulfonic group per an aromatic ring where $n_1$, $n_2$ and $n_3$ are, respectively, integers from 0 to 2 and $n_2+n_3$ is an integer from 1 to 4; $X^3$ is one or more types of functional groups which are selected from the group consisting of —CN, —COOY and —CONR$_2$, where Y indicates hydrogen, a metal atom or a variety of ammonium and R indicates one or two types of groups selected from the group consisting of hydrogen and alkyl groups; Z$^1$ and Z$^2$ are one or more types of functional groups selected from the group consisting of lower alkyl groups having 1 to 6 carbon atoms, lower alkoxyl groups having 1 to 6 carbon atoms, lower carboxyl groups having 1 to 6 carbon atoms, lower carbonyl groups having 1 to 6 carbon atoms, nitro groups, amino groups, hydroxyl groups and halogen atoms, r$^1$ and r$^2$ indicate the respective numbers of bonds of Z$^1$ and Z$^2$ per an aromatic ring where r$^1$ and r$^2$ are, respectively, integers from 0 to 4 and $n_2+r^1 \leq 4$ and $n_3+r^2 \leq 4$.

6. The polyarylene ether-based compound according to claim 5, further comprising a polymer component represented in general formula (7):

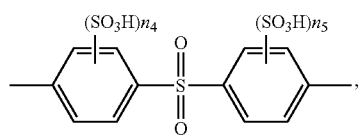

(7)

wherein $n_4$ and $n_5$ indicate the numbers of bonds of the sulfonic group per an aromatic ring where $n_4$ and $n_5$ are, respectively, integers from 0 to 2 and $n_4+n_5$ is an integer from 1 to 4.

7. The polyarylene ether-based compound according to claim 1, wherein the sulfonic group content is within a range from 0.3 meq/g to 3.5 meq/g.

8. The polyarylene ether-based compound according to claim 5, wherein the sulfonic group content is within a range from 0.2 meq/g to 6.0 meq/g.

9. A polyarylene ether-based compound which has a structure in that a sulfonic group is introduced to a polyarylene ether-based polymer that includes 52 wt % or higher of a dioxybiphenylene unit (—O-Ph-Ph-O—) in the polymer structure.

10. The polyarylene ether-based compound according to claim 9, comprising polymer components represented in general formula (3) and general formula (4):

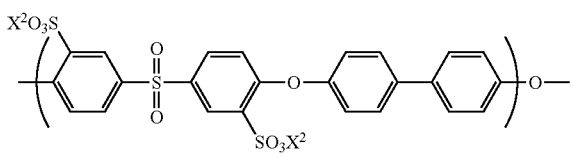

(3)

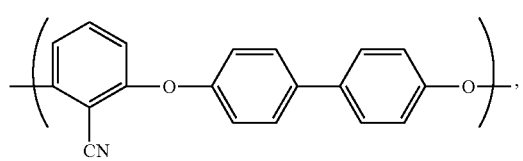

(4)

wherein X$^2$ indicates H or a monovalent cation species.

11. The polyarylene ether-based compound according to claim 9, further comprising polymer components represented in general formula (5) and general formula (6):

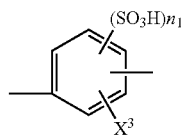

(5)

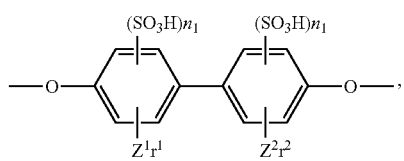

(6)

wherein $n_1$, $n_2$ and $n_3$ indicate the numbers of bonds of a sulfonic group per an aromatic ring where $n_1$, $n_2$ and $n_3$ are, respectively, integers from 0 to 2 and $n_2+n_3$ is an integer from 1 to 4; X$^3$ is one or more types of functional groups selected from the group consisting of —CN, —COOY and —CONR$_2$, where Y indicates hydrogen, a metal atom or a variety of ammonium and R indicates one or two types of groups selected from the group consisting of hydrogen and alkyl groups; Z$^1$ and Z$^2$ are one or more types of functional groups selected from the group consisting of lower alkyl groups having 1 to 6 carbon atoms, lower alkoxyl groups having 1 to 6 carbon atoms, lower carboxyl groups having 1 to 6 carbon atoms, lower carbonyl groups having 1 to 6 carbon atoms, nitro groups, amino groups, hydroxyl groups and halogen atoms, r$^1$ and r$^2$ indicate the respective numbers of bonds of Z$^1$ and Z$^2$ per an aromatic ring where r$^1$ and r$^2$ are, respectively, integers from 0 to 4 and $n_2+r^1 \leq 4$ and $n_3+r^2 \leq 4$.

12. The polyarylene ether-based compound according to claim 11, further comprising a polymer component represented in general formula (7):

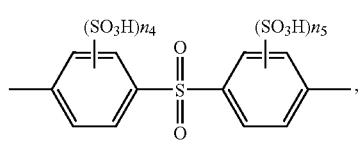

(7)

wherein $n_4$ and $n_5$ indicate the numbers of bonds of the sulfonic group per an aromatic ring where $n_4$ and $n_5$ are, respectively, integers from 0 to 2 and $n_4+n_5$ is an integer from 1 to 4.

13. The polyarylene ether-based compound according to claim 9, wherein the sulfonic group content is within a range from 0.2 meq/g to 6.0 meq/g.

14. A manufacturing method of the polyarylene ether compound according to claim 1, wherein compounds represented in general formulas (13) and (14) and a bisphenol-based compound are included in an aromatic nucleophilic substitution reaction as monomers and thus are polymerized:

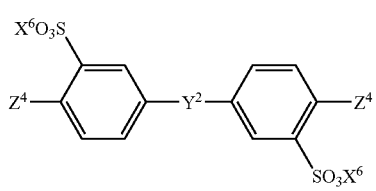

(13)

-continued (14)

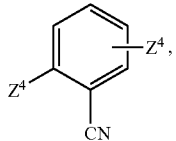

wherein Y² indicates a sulfone group or a ketone group, X⁶ indicates a monovalent cation species and Z⁴ indicates chlorine or fluorine.

15. A manufacturing method of the polyarylene ether compound according to claim 9, wherein compounds represented in general formulas (13) and (14) and a bisphenol-based compound are included in an aromatic nucleophilic substitution reaction as monomers and thus are polymerized:

(13)

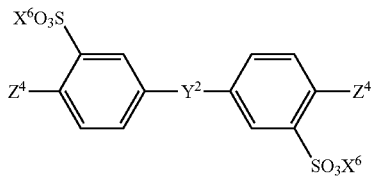

(14)

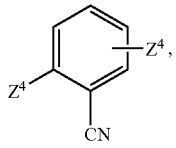

wherein Y² indicates a sulfone group or a ketone group, X⁶ indicates a monovalent cation species and Z⁴ indicates chlorine or fluorine.

16. A composition comprising 50 wt % to 100 wt % of the polyarylene ether compound according to claim 1.

17. A composition comprising 50 wt % to 100 wt % of the polyarylene ether compound according to claim 9.

18. A composition comprising: a polybenzimidazole-based compound that includes a polymer component represented in general formula (8); and the polyarylene ether-based compound according to claim 1:

(8)

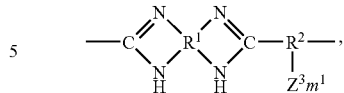

wherein $m^1$ indicates an integer of 1 to 4, $R^1$ indicates a tetravalent aromatic bond unit that can form an imidazole ring, $R^2$ indicates a divalent aromatic bond unit where both $R^1$ and $R^2$ may be single aromatic rings, or combinations or condensed rings of a number of aromatic rings, and may have a stable substitution group, and $Z^3$ indicates a sulfonic group and/or a phosphonic group a portion of which may have a salt structure.

19. A composition comprising: a polybenzimidazole-based compound that includes a polymer component represented in general formula (8); and the polyarylene ether-based compound according to claim 9:

(8)

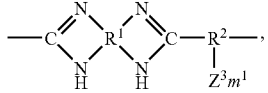

wherein $m^1$ indicates an integer of 1 to 4, $R^1$ indicates a tetravalent aromatic bond unit that can form an imidazole ring, $R^2$ indicates a divalent aromatic bond unit where both $R^1$ and $R^2$ may be single aromatic rings, or combinations or condensed rings of a number of aromatic rings, and may have a stable substitution group, and $Z^3$ indicates a sulfonic group and/or a phosphonic group a portion of which may have a salt structure.

20. The composition according to claim 18, wherein the polybenzimidazole-based compound contains polymer components represented in general formulas (9) and (10) in a mole ratio of (9):(10)=$n^6$:(1−$n^6$):

(9)

(10)

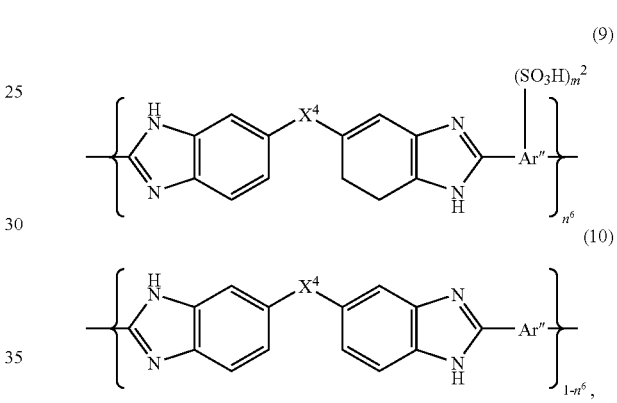

wherein $m^2$ indicates an integer of 1 to 4, Ar″ indicates a divalent aromatic bond unit, X⁴ indicates one or more types selected from the group consisting of —O—, —SO₂—, —C(CH₃)₂—, —C(CF₃)₂— and —OPhO—, and Ph indicates a divalent aromatic bond unit where $0.2 \leq n_6 \leq 1.0$.

21. The composition according to claim 19, wherein the polybenzimidazole-based compound contains polymer components represented in general formulas (9) and (10) in a mole ratio of (9):(10)=$n^6$:(1−$n^6$):

(9)

(10)

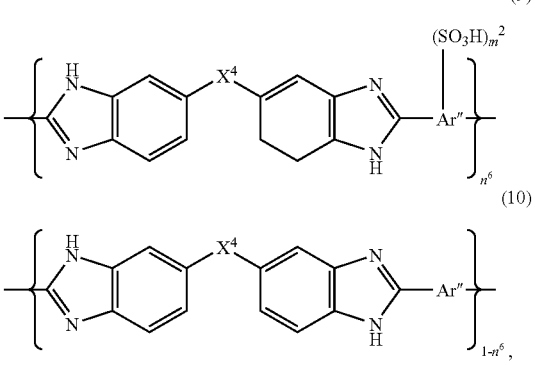

wherein $m^2$ indicates an integer of 1 to 4, Ar″ indicates a divalent aromatic bond unit, X⁴ indicates one or more types selected from the group consisting of —O—, —SO₂—, —C(CH₃)₂—, —C(CF₃)₂— and —OPhO—, and Ph indicates a divalent aromatic bond unit where $0.2 \leq n_6 \leq 1.0$.

22. The composition according to claim 18, wherein the polybenzimidazole-based compound contains polymer components represented in general formulas (11) and (12) in a mole ratio of $(11):(12)=n^7:(1-n^7)$:

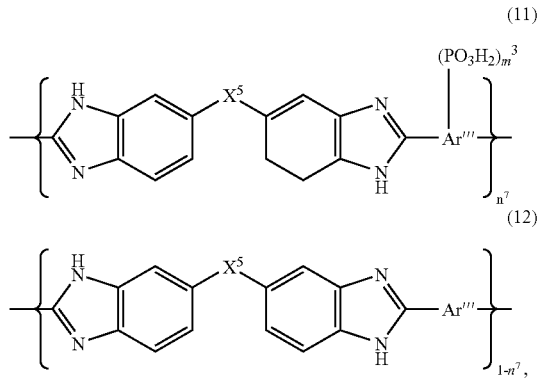

wherein m³ indicates an integer of 1 to 4, Ar‴ indicates an aromatic bond unit, X⁵ indicates one or more types selected from the group consisting of —O—, —SO₂—, —S—, —CH₂— and —OPhO—, Ph indicates a divalent aromatic bond unit and n⁷ is within a range from 0.2 to 1.0.

23. The composition according to claim 19, wherein the polybenzimidazole-based compound contains polymer components represented in general formulas (11) and (12) in a mole ratio of $(11):(12)=n^7:(1-n^7)$:

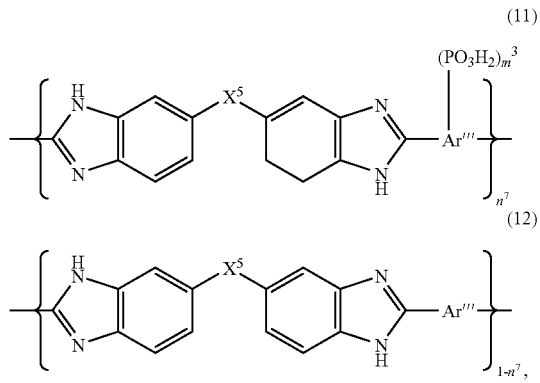

wherein m³ indicates an integer of 1 to 4, Ar‴ indicates an aromatic bond unit, X⁵ indicates one or more types selected from the group consisting of —O—, —SO₂—, —S—, —CH₂— and —OPhO—, Ph indicates a divalent aromatic bond unit and n⁷ is within a range from 0.2 to 1.0.

24. The composition according to claim 16, wherein the amount of sulfonic acid and/or phosphonic acid that is included in said polyarylene ether-based compound and/or polybenzimidazole-based compound is 0.5 to 4.0 equivalent/kg.

25. The composition according to claim 17, wherein the amount of sulfonic acid and/or phosphonic acid that is included in said polyarylene ether-based compound and/or polybenzimidazole-based compound is 0.5 to 4.0 equivalent/kg.

26. An ion conducting membrane comprising the compound according to claim 1.

27. An ion conducting membrane comprising the compound according to claim 9.

28. The ion conducting membrane according to claim 26, wherein methanol permeation rate through the membrane with an average thickness of 50 μm in a 5M methanol aqueous solution is 7 mmol/m²·sec or less at 25° C.

29. The ion conducting membrane according to claim 27, wherein the methanol permeation rate through the membrane with an average thickness of 50 μm in a 5M methanol aqueous solution is 7 mmol/m²·sec or less at 25° C.

30. A manufacturing method of the ion conducting membrane according to claim 26, comprising the steps of: casting a solution that contains the compound according to claim 1 and a solvent in a manner where the cast thickness becomes in a range from 10 μm to 1000 μm; and drying the cast solution.

31. A manufacturing method of the ion conducting membrane according to claim 27, comprising the steps of: casting a solution that contains the compound according to claim 9 and a solvent in a manner where the cast thickness becomes in a range from 10 μm to 1000 μm; and drying the cast solution.

32. An assembly comprising the ion conducting membrane according to claim 26, and electrodes.

33. An assembly comprising the ion conducting membrane according to claim 27 and electrodes.

34. A fuel cell comprising the assembly according to claim 32.

35. A fuel cell comprising the assembly according to claim 33.

36. The fuel cell according to claim 34, which uses methanol as the fuel.

37. The fuel cell according to claim 35, which uses methanol as the fuel.

38. An adhesive comprising the compound according to claim 1.

39. An adhesive comprising the compound according to claim 9.

* * * * *